US012587371B2

(12) United States Patent
Chopra et al.

(10) Patent No.: US 12,587,371 B2
(45) Date of Patent: *Mar. 24, 2026

(54) PRIVACY-PRESERVING MULTI-TOUCH ATTRIBUTION

(71) Applicant: Snap Inc., Santa Monica, CA (US)

(72) Inventors: Samarth Chopra, Santa Monica, CA (US); Amit Datta, Los Angeles, CA (US); Apoorvaa Deshpande, Mountain View, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/426,889

(22) Filed: Jan. 30, 2024

(65) Prior Publication Data

US 2024/0171382 A1 May 23, 2024

Related U.S. Application Data

(63) Continuation of application No. 17/477,383, filed on Sep. 16, 2021, now Pat. No. 11,949,778.

(Continued)

(51) Int. Cl.
| | |
|---|---|
| *H04L 29/06* | (2006.01) |
| *G06F 21/00* | (2013.01) |
| *H04L 9/08* | (2006.01) |
| *H04L 9/30* | (2006.01) |
| *H04L 9/32* | (2006.01) |

(52) U.S. Cl.
CPC .......... *H04L 9/0847* (2013.01); *H04L 9/0869* (2013.01); *H04L 9/0894* (2013.01); *H04L 9/30* (2013.01); *H04L 9/3236* (2013.01)

(58) Field of Classification Search
CPC ................ H04L 9/0847; H04L 9/0869; H04L 9/0894; H04L 9/30; H04L 9/323
See application file for complete search history.

(56) References Cited

U.S. PATENT DOCUMENTS

| | | |
|---|---|---|
| 5,124,117 A | 6/1992 | Tatebayashi et al. |
| 5,754,939 A | 5/1998 | Herz et al. |

(Continued)

FOREIGN PATENT DOCUMENTS

WO WO-2016122513 A1 8/2016

OTHER PUBLICATIONS

"U.S. Appl. No. 17/477,383, Corrected Notice of Allowability mailed Dec. 1, 2023", 3 pgs.

(Continued)

*Primary Examiner* — Lisa C Lewis
(74) *Attorney, Agent, or Firm* — Schwegman Lundberg & Woessner, P.A.

(57) ABSTRACT

Systems and methods herein describe privacy preserving multi-touch attribution. The described systems access a plurality of impression events and a plurality of conversion events, and for each impression event and each conversion event, wherein each impression event and each conversion event are associated with user identifiers, the described systems generates a hashed user identifier based on the associated user identifier, initiates a key agreement protocol comprising a key, generates an encrypted identifier by encrypting the hashed user identifier with the key, and stores the encrypted identifier.

20 Claims, 9 Drawing Sheets

Related U.S. Application Data

(60) Provisional application No. 62/706,902, filed on Sep. 16, 2020.

(56) References Cited

U.S. PATENT DOCUMENTS

| | | | |
|---|---|---|---|
| 5,923,763 A | 7/1999 | Walker et al. | |
| 6,085,320 A | 7/2000 | Kaliski, Jr. | |
| 6,510,513 B1 | 1/2003 | Danieli | |
| 7,039,946 B1 | 5/2006 | Binding et al. | |
| 7,100,195 B1 | 8/2006 | Underwood | |
| 7,184,971 B1 | 2/2007 | Ferber | |
| 7,266,685 B1 | 9/2007 | Meandzija et al. | |
| 7,305,558 B1 | 12/2007 | Miyazaki et al. | |
| 7,861,077 B1 | 12/2010 | Gallagher, III | |
| 8,032,744 B2 | 10/2011 | Doonan et al. | |
| 8,156,326 B2 | 4/2012 | Di Giusto et al. | |
| 8,291,016 B1 | 10/2012 | Whitney et al. | |
| 8,312,518 B1 | 11/2012 | Ezell et al. | |
| 8,583,915 B1 | 11/2013 | Huang | |
| 8,677,133 B1 | 3/2014 | Spencer | |
| 8,892,873 B1 | 11/2014 | Souza et al. | |
| 8,972,525 B1 | 3/2015 | Ramachandran et al. | |
| 9,158,925 B2 | 10/2015 | Kamara | |
| 9,256,761 B1 | 2/2016 | Sahu et al. | |
| 9,300,639 B1 | 3/2016 | Roth et al. | |
| 9,398,077 B2 | 7/2016 | Bosworth et al. | |
| 9,442,980 B1 | 9/2016 | Trepetin et al. | |
| 9,443,092 B2 | 9/2016 | Nawaz et al. | |
| 9,485,098 B1 | 11/2016 | Lepeshenkov | |
| 9,608,813 B1 | 3/2017 | Roth et al. | |
| 9,647,837 B2 | 5/2017 | Gorbach et al. | |
| 9,680,872 B1 | 6/2017 | Roth et al. | |
| 9,692,757 B1 | 6/2017 | Mikulski et al. | |
| 9,853,949 B1 | 12/2017 | Stickle et al. | |
| 9,935,772 B1 | 4/2018 | Madisetti et al. | |
| 9,990,650 B1 | 6/2018 | Kakani et al. | |
| 10,015,171 B1 | 7/2018 | Vardy et al. | |
| 10,110,385 B1 | 10/2018 | Rush et al. | |
| 10,134,058 B2 * | 11/2018 | Dasdan | G06Q 30/0275 |
| 10,192,244 B2 | 1/2019 | Athsani et al. | |
| 10,204,359 B1 | 2/2019 | Lee et al. | |
| 10,211,977 B1 | 2/2019 | Roth et al. | |
| 10,231,085 B1 | 3/2019 | Kumar et al. | |
| 10,311,240 B1 | 6/2019 | Nissler et al. | |
| 10,320,569 B1 | 6/2019 | Wentz et al. | |
| 10,331,713 B1 | 6/2019 | Chahal | |
| 10,432,618 B1 | 10/2019 | Poder et al. | |
| 10,439,815 B1 | 10/2019 | Poder et al. | |
| 10,475,066 B1 | 11/2019 | Kakani et al. | |
| 10,484,364 B2 | 11/2019 | Bransom et al. | |
| 10,530,577 B1 | 1/2020 | Pazhoor et al. | |
| 10,600,076 B2 | 3/2020 | Mirisola et al. | |
| 10,621,660 B1 | 4/2020 | Medina et al. | |
| 10,673,617 B1 | 6/2020 | Antoniou et al. | |
| 10,742,423 B1 | 8/2020 | Yan et al. | |
| 10,810,357 B1 | 10/2020 | Tsypliaev et al. | |
| 10,846,372 B1 | 11/2020 | Jayachandran et al. | |
| 10,887,104 B1 | 1/2021 | Jayachandran et al. | |
| 10,921,130 B1 | 2/2021 | Fowe et al. | |
| 10,936,744 B1 | 3/2021 | Trepetin et al. | |
| 10,939,405 B1 | 3/2021 | Haleem et al. | |
| 10,957,355 B2 | 3/2021 | Albertson et al. | |
| 11,036,834 B2 | 6/2021 | Li | |
| 11,050,725 B2 | 6/2021 | Becher et al. | |
| 11,140,171 B1 | 10/2021 | Friedman et al. | |
| 11,151,584 B1 | 10/2021 | Sharma et al. | |
| 11,188,523 B1 | 11/2021 | Harold | |
| 11,190,338 B1 | 11/2021 | Corey et al. | |
| 11,216,575 B2 | 1/2022 | Cox, Jr. et al. | |
| 11,216,838 B1 | 1/2022 | Karlsson et al. | |
| 11,232,503 B1 | 1/2022 | Rodriguez | |
| 11,379,611 B1 | 7/2022 | Horesh et al. | |
| 11,475,150 B2 | 10/2022 | Baird, III | |
| 11,501,370 B1 | 11/2022 | Paya et al. | |
| 11,514,478 B1 | 11/2022 | Paran et al. | |
| 11,546,138 B2 | 1/2023 | Mord et al. | |
| 11,550,931 B1 | 1/2023 | Dintchev et al. | |
| 11,599,655 B1 | 3/2023 | Meng et al. | |
| 11,861,027 B2 | 1/2024 | Cox, Jr. et al. | |
| 11,861,712 B1 | 1/2024 | Kenigsberg et al. | |
| 11,949,778 B1 | 4/2024 | Chopra et al. | |
| 12,045,364 B1 | 7/2024 | Trepetin et al. | |
| 12,184,785 B2 | 12/2024 | Chen | |
| 2001/0011350 A1 | 8/2001 | Zabetian | |
| 2002/0026321 A1 | 2/2002 | Faris et al. | |
| 2002/0120850 A1 | 8/2002 | Walker et al. | |
| 2002/0196685 A1 | 12/2002 | Topham | |
| 2003/0023851 A1 | 1/2003 | Peha | |
| 2003/0028778 A1 | 2/2003 | Couillard | |
| 2004/0128500 A1 | 7/2004 | Cihula et al. | |
| 2005/0005095 A1 | 1/2005 | Meandzija et al. | |
| 2005/0235140 A1 | 10/2005 | Hui et al. | |
| 2005/0268326 A1 | 12/2005 | Bhargavan et al. | |
| 2006/0184797 A1 | 8/2006 | Weis et al. | |
| 2006/0200855 A1 | 9/2006 | Willis | |
| 2006/0245587 A1 | 11/2006 | Pinkas et al. | |
| 2007/0006305 A1 | 1/2007 | Florencio et al. | |
| 2007/0022294 A1 | 1/2007 | Lapstun et al. | |
| 2007/0038857 A1 | 2/2007 | Gosnell | |
| 2007/0106892 A1 | 5/2007 | Engberg | |
| 2007/0220259 A1 | 9/2007 | Pavlicic | |
| 2008/0189169 A1 | 8/2008 | Turpin et al. | |
| 2008/0235518 A1 | 9/2008 | Chen et al. | |
| 2009/0013177 A1 | 1/2009 | Lee et al. | |
| 2009/0100041 A1 | 4/2009 | Wilson | |
| 2009/0228701 A1 | 9/2009 | Lin | |
| 2009/0276623 A1 | 11/2009 | Jevans et al. | |
| 2009/0292587 A1 | 11/2009 | Fitzgerald | |
| 2010/0049969 A1 | 2/2010 | Shon | |
| 2010/0088236 A1 | 4/2010 | Karabulut et al. | |
| 2010/0100465 A1 | 4/2010 | Cooke et al. | |
| 2010/0235220 A1 | 9/2010 | Guha et al. | |
| 2011/0040784 A1 | 2/2011 | Rousseau | |
| 2011/0213965 A1 | 9/2011 | Fu et al. | |
| 2011/0213966 A1 | 9/2011 | Fu et al. | |
| 2011/0246267 A1 | 10/2011 | Williams et al. | |
| 2012/0036080 A1 | 2/2012 | Singer et al. | |
| 2012/0084569 A1 | 4/2012 | Feller et al. | |
| 2012/0110343 A1 | 5/2012 | Bandic et al. | |
| 2012/0213359 A1 | 8/2012 | Troncoso et al. | |
| 2012/0259871 A1 | 10/2012 | Holmes et al. | |
| 2013/0060640 A1 | 3/2013 | Gadhia et al. | |
| 2013/0124333 A1 | 5/2013 | Doughty et al. | |
| 2013/0124870 A1 | 5/2013 | Rosati et al. | |
| 2013/0138569 A1 | 5/2013 | Yan et al. | |
| 2013/0145152 A1 | 6/2013 | Maino et al. | |
| 2013/0290707 A1 | 10/2013 | Sinclair et al. | |
| 2014/0040611 A1 | 2/2014 | Tenenboym et al. | |
| 2014/0046777 A1 | 2/2014 | Markey et al. | |
| 2014/0079217 A1 | 3/2014 | Bai et al. | |
| 2014/0108786 A1 | 4/2014 | Kreft | |
| 2014/0164136 A1 | 6/2014 | Posse et al. | |
| 2014/0172627 A1 | 6/2014 | Levy et al. | |
| 2014/0229738 A1 | 8/2014 | Sato | |
| 2014/0289509 A1 | 9/2014 | Baghdasaryan | |
| 2014/0298035 A1 | 10/2014 | Tredoux et al. | |
| 2014/0304107 A1 | 10/2014 | Mcallister | |
| 2014/0359606 A1 | 12/2014 | Salameh et al. | |
| 2014/0365775 A1 | 12/2014 | Yavuz et al. | |
| 2015/0033305 A1 | 1/2015 | Shear et al. | |
| 2015/0067118 A1 | 3/2015 | Gatto et al. | |
| 2015/0086009 A1 | 3/2015 | Harjula et al. | |
| 2015/0086018 A1 | 3/2015 | Harjula et al. | |
| 2015/0086020 A1 | 3/2015 | Harjula et al. | |
| 2015/0127565 A1 | 5/2015 | Chevalier et al. | |
| 2015/0134552 A1 | 5/2015 | Engels et al. | |
| 2015/0161652 A1 | 6/2015 | Schnabl et al. | |
| 2015/0213484 A1 * | 7/2015 | Amara | H04L 67/535 |
| | | | 707/E17.014 |
| 2015/0221151 A1 * | 8/2015 | Bacco | H04L 9/3231 |
| | | | 340/5.83 |
| 2015/0269383 A1 | 9/2015 | Lang et al. | |
| 2015/0269624 A1 | 9/2015 | Cheng et al. | |
| 2015/0269630 A1 | 9/2015 | Flood et al. | |

(56) References Cited

U.S. PATENT DOCUMENTS

| | | |
|---|---|---|
| 2015/0287091 A1 | 10/2015 | Koran |
| 2015/0288665 A1 | 10/2015 | El Emam et al. |
| 2015/0339664 A1 | 11/2015 | Wong et al. |
| 2015/0341333 A1 | 11/2015 | Feng |
| 2016/0004820 A1 | 1/2016 | Moore |
| 2016/0036588 A1 | 2/2016 | Thackston |
| 2016/0048869 A1 | 2/2016 | Shim et al. |
| 2016/0072805 A1 | 3/2016 | Freudiger et al. |
| 2016/0092474 A1 | 3/2016 | Stojanovic et al. |
| 2016/0092476 A1 | 3/2016 | Stojanovic et al. |
| 2016/0092557 A1 | 3/2016 | Stojanovic et al. |
| 2016/0098723 A1 | 4/2016 | Feeney |
| 2016/0098730 A1 | 4/2016 | Feeney |
| 2016/0103758 A1 | 4/2016 | Zhao et al. |
| 2016/0104208 A1 | 4/2016 | Keiser et al. |
| 2016/0110775 A1 | 4/2016 | Moiz et al. |
| 2016/0117736 A1 | 4/2016 | Dasdan et al. |
| 2016/0119119 A1 | 4/2016 | Calapodescu et al. |
| 2016/0132906 A1 | 5/2016 | Khavronin et al. |
| 2016/0140545 A1 | 5/2016 | Flurscheim et al. |
| 2016/0162897 A1 | 6/2016 | Feeney |
| 2016/0170996 A1 | 6/2016 | Frank et al. |
| 2016/0188892 A1 | 6/2016 | Morimoto |
| 2016/0203522 A1 | 7/2016 | Shiffert et al. |
| 2016/0210547 A1 | 7/2016 | Dekeyser et al. |
| 2016/0241402 A1 | 8/2016 | Gordon et al. |
| 2016/0253710 A1 | 9/2016 | Publicover et al. |
| 2016/0285882 A1 | 9/2016 | Brunn et al. |
| 2016/0292678 A1 | 10/2016 | Lai |
| 2016/0296810 A1 | 10/2016 | Mandel et al. |
| 2016/0323102 A1 | 11/2016 | Freudiger et al. |
| 2016/0342774 A1 | 11/2016 | Henkel-Wallace et al. |
| 2016/0344729 A1 | 11/2016 | Slaight et al. |
| 2016/0352732 A1 | 12/2016 | Bamasag et al. |
| 2016/0373891 A1 | 12/2016 | Ramer et al. |
| 2016/0379279 A1 | 12/2016 | Ashery et al. |
| 2017/0006024 A1 | 1/2017 | Pedersen |
| 2017/0018184 A1 | 1/2017 | Northrup et al. |
| 2017/0032413 A1 | 2/2017 | McCartney |
| 2017/0041296 A1 | 2/2017 | Ford et al. |
| 2017/0054566 A1 | 2/2017 | Nitschke |
| 2017/0063810 A1 | 3/2017 | Bruce et al. |
| 2017/0075938 A1 | 3/2017 | Black et al. |
| 2017/0080346 A1 | 3/2017 | Abbas |
| 2017/0091319 A1 | 3/2017 | Legrand et al. |
| 2017/0123614 A1 | 5/2017 | Perlegos et al. |
| 2017/0127241 A1 | 5/2017 | Sjölund et al. |
| 2017/0141926 A1 | 5/2017 | Xu et al. |
| 2017/0163617 A1 | 6/2017 | Laxminarayanan et al. |
| 2017/0223003 A1 | 8/2017 | Miles et al. |
| 2017/0228768 A1 | 8/2017 | Saxena et al. |
| 2017/0289341 A1 | 10/2017 | Rodriguez et al. |
| 2017/0315979 A1 | 11/2017 | Boucher et al. |
| 2017/0346637 A1 | 11/2017 | Zhang |
| 2017/0346693 A1 | 11/2017 | Dix et al. |
| 2017/0364931 A1 | 12/2017 | Khavronin et al. |
| 2017/0366500 A1 | 12/2017 | Fadeev et al. |
| 2018/0019867 A1 | 1/2018 | Davis |
| 2018/0025185 A1 | 1/2018 | Hattrup et al. |
| 2018/0025442 A1 | 1/2018 | Isaacson et al. |
| 2018/0033244 A1 | 2/2018 | Northrup et al. |
| 2018/0039990 A1 | 2/2018 | Lindemann |
| 2018/0068130 A1 | 3/2018 | Chan et al. |
| 2018/0074786 A1 | 3/2018 | Oberbreckling et al. |
| 2018/0075104 A1 | 3/2018 | Oberbreckling et al. |
| 2018/0075115 A1 | 3/2018 | Murray et al. |
| 2018/0096340 A1 | 4/2018 | Omojola et al. |
| 2018/0101621 A1 | 4/2018 | Lewak et al. |
| 2018/0137512 A1 | 5/2018 | Georgiadis et al. |
| 2018/0150488 A1 | 5/2018 | Runchey |
| 2018/0152410 A1 | 5/2018 | Jackson |
| 2018/0157761 A1 | 6/2018 | Halstead et al. |
| 2018/0159833 A1 | 6/2018 | Zhang et al. |
| 2018/0183600 A1 | 6/2018 | Davis |
| 2018/0183601 A1 | 6/2018 | Campagna et al. |
| 2018/0189714 A1 | 7/2018 | Azpitarte et al. |
| 2018/0191501 A1 | 7/2018 | Lindemann |
| 2018/0191720 A1 | 7/2018 | Dawes |
| 2018/0198601 A1 | 7/2018 | Laine et al. |
| 2018/0204111 A1 | 7/2018 | Zadeh et al. |
| 2018/0211718 A1 | 7/2018 | Heath |
| 2018/0212937 A1 | 7/2018 | Wang et al. |
| 2018/0218030 A1 | 8/2018 | Wong et al. |
| 2018/0218032 A1 | 8/2018 | Wong et al. |
| 2018/0218044 A1 | 8/2018 | Wong et al. |
| 2018/0225717 A1 | 8/2018 | Storti |
| 2018/0227131 A1 | 8/2018 | Ebrahimi et al. |
| 2018/0249504 A1 | 8/2018 | Grissa et al. |
| 2018/0254893 A1 | 9/2018 | Saxena et al. |
| 2018/0278623 A1 | 9/2018 | Koskimies et al. |
| 2018/0278624 A1 | 9/2018 | Kuperman et al. |
| 2018/0293686 A1 | 10/2018 | Lane |
| 2018/0329990 A1 | 11/2018 | Severn et al. |
| 2018/0341839 A1 | 11/2018 | Malak et al. |
| 2018/0351747 A1 | 12/2018 | Spangemacher et al. |
| 2018/0357661 A1 | 12/2018 | Fadeev et al. |
| 2018/0365710 A1 | 12/2018 | Halecky et al. |
| 2018/0367293 A1 | 12/2018 | Chen et al. |
| 2018/0375841 A1 | 12/2018 | Tola |
| 2019/0014116 A1 | 1/2019 | Khi et al. |
| 2019/0043080 A1 | 2/2019 | Buchalter et al. |
| 2019/0050874 A1 | 2/2019 | Matlick et al. |
| 2019/0066119 A1 | 2/2019 | Sengupta et al. |
| 2019/0068384 A1 | 2/2019 | Morimoto |
| 2019/0074975 A1 | 3/2019 | Koskimies |
| 2019/0098013 A1 | 3/2019 | Wilkinson |
| 2019/0102438 A1 | 4/2019 | Murray et al. |
| 2019/0108542 A1 | 4/2019 | Durvasula et al. |
| 2019/0114182 A1 | 4/2019 | Chalakudi et al. |
| 2019/0120929 A1 | 4/2019 | Meadow |
| 2019/0140828 A1 | 5/2019 | Wheeler et al. |
| 2019/0149334 A1 | 5/2019 | Van Der Velden |
| 2019/0163896 A1 | 5/2019 | Balaraman et al. |
| 2019/0164156 A1 | 5/2019 | Lindemann |
| 2019/0164157 A1 | 5/2019 | Balaraman et al. |
| 2019/0179806 A1 | 6/2019 | Reinsberg et al. |
| 2019/0188710 A1 | 6/2019 | Mittal et al. |
| 2019/0199522 A1 | 6/2019 | Liao et al. |
| 2019/0222424 A1 | 7/2019 | Lindemann |
| 2019/0228144 A1 | 7/2019 | Kermes et al. |
| 2019/0230504 A1 | 7/2019 | Ierullo |
| 2019/0244243 A1 | 8/2019 | Goldberg et al. |
| 2019/0251122 A1 | 8/2019 | Rivas et al. |
| 2019/0258986 A1 | 8/2019 | Nguyen et al. |
| 2019/0260592 A1 | 8/2019 | Nguyen et al. |
| 2019/0260667 A1 | 8/2019 | Aguado Martin et al. |
| 2019/0267036 A1 | 8/2019 | Albertson et al. |
| 2019/0273606 A1 | 9/2019 | Okabe et al. |
| 2019/0273607 A1 | 9/2019 | Van Der Velden et al. |
| 2019/0278944 A1 | 9/2019 | Cheng et al. |
| 2019/0280862 A1 | 9/2019 | Crego et al. |
| 2019/0282906 A1 | 9/2019 | Yong |
| 2019/0287138 A1 | 9/2019 | Buchalter et al. |
| 2019/0294642 A1 | 9/2019 | Matlick et al. |
| 2019/0303888 A1 | 10/2019 | Hamasni et al. |
| 2019/0303920 A1 | 10/2019 | Balaraman et al. |
| 2019/0303942 A1 | 10/2019 | Balaraman et al. |
| 2019/0312734 A1 | 10/2019 | Wentz et al. |
| 2019/0320320 A1 | 10/2019 | Li et al. |
| 2019/0340876 A1 | 11/2019 | Northrup et al. |
| 2019/0342270 A1 | 11/2019 | Laine et al. |
| 2019/0349426 A1 | 11/2019 | Smith et al. |
| 2019/0356491 A1 | 11/2019 | Herder, III et al. |
| 2019/0356641 A1 | 11/2019 | Isaacson et al. |
| 2019/0363892 A1 | 11/2019 | Wang |
| 2019/0364154 A1 | 11/2019 | Hermanek et al. |
| 2019/0370855 A1 | 12/2019 | Boyapally et al. |
| 2019/0377890 A1 | 12/2019 | Leavitt et al. |
| 2019/0385392 A1 | 12/2019 | Cho et al. |
| 2020/0007331 A1 | 1/2020 | Wentz |
| 2020/0007343 A1 | 1/2020 | Evans |
| 2020/0007344 A1 | 1/2020 | Chepak, Jr. et al. |
| 2020/0019288 A1 | 1/2020 | D'amore et al. |
| 2020/0027137 A1 | 1/2020 | Miller et al. |

(56) References Cited

U.S. PATENT DOCUMENTS

| | | | |
|---|---|---|---|
| 2020/0028672 A1 | 1/2020 | Tang |
| 2020/0028947 A1 | 1/2020 | Yang |
| 2020/0052898 A1 | 2/2020 | Wentz |
| 2020/0065137 A1 | 2/2020 | Wigder |
| 2020/0067705 A1 | 2/2020 | Brown et al. |
| 2020/0067709 A1 | 2/2020 | Brown et al. |
| 2020/0067907 A1 | 2/2020 | Avetisov et al. |
| 2020/0076829 A1 | 3/2020 | Wentz |
| 2020/0084232 A1 | 3/2020 | Lebling et al. |
| 2020/0084483 A1 | 3/2020 | Brown et al. |
| 2020/0090167 A1 | 3/2020 | Cole |
| 2020/0110648 A1 | 4/2020 | Yang |
| 2020/0111069 A1 | 4/2020 | Chahal |
| 2020/0112442 A1 | 4/2020 | Wentz |
| 2020/0117834 A1 | 4/2020 | Walcott |
| 2020/0127860 A1 | 4/2020 | Aschauer et al. |
| 2020/0127861 A1 | 4/2020 | Doshi et al. |
| 2020/0128043 A1 | 4/2020 | Xie |
| 2020/0128044 A1 | 4/2020 | Xie |
| 2020/0134671 A1 | 4/2020 | Maccini et al. |
| 2020/0153627 A1 | 5/2020 | Wentz |
| 2020/0155944 A1 | 5/2020 | Witchey et al. |
| 2020/0162268 A1 | 5/2020 | Wentz |
| 2020/0169417 A1 | 5/2020 | Yang et al. |
| 2020/0169425 A1 | 5/2020 | Hofstee et al. |
| 2020/0184278 A1 | 6/2020 | Zadeh et al. |
| 2020/0186355 A1 | 6/2020 | Davies |
| 2020/0193717 A1 | 6/2020 | Daly |
| 2020/0195436 A1 | 6/2020 | Khan |
| 2020/0201679 A1 | 6/2020 | Wentz |
| 2020/0213094 A1 | 7/2020 | Yang |
| 2020/0213136 A1 | 7/2020 | Yang et al. |
| 2020/0234283 A1 | 7/2020 | Greiche et al. |
| 2020/0234333 A1 | 7/2020 | Huang et al. |
| 2020/0250339 A1 | 8/2020 | Rosedale |
| 2020/0259643 A1 | 8/2020 | Pazhoor et al. |
| 2020/0267163 A1 | 8/2020 | Wilson |
| 2020/0272619 A1 | 8/2020 | Alferov |
| 2020/0273578 A1 | 8/2020 | Kutzko et al. |
| 2020/0280436 A1* | 9/2020 | Nix ........................ H04L 9/0869 |
| 2020/0285619 A1 | 9/2020 | Teyer |
| 2020/0295932 A1 | 9/2020 | Chien |
| 2020/0296128 A1 | 9/2020 | Wentz |
| 2020/0302088 A1 | 9/2020 | Lee et al. |
| 2020/0304326 A1 | 9/2020 | Xie |
| 2020/0311309 A1 | 10/2020 | Dawer et al. |
| 2020/0311665 A1 | 10/2020 | Gray et al. |
| 2020/0313898 A1 | 10/2020 | Troia et al. |
| 2020/0320199 A1 | 10/2020 | Sheth et al. |
| 2020/0322041 A1 | 10/2020 | Chao et al. |
| 2020/0322075 A1 | 10/2020 | Bhandari et al. |
| 2020/0322176 A1 | 10/2020 | Bhandari et al. |
| 2020/0334244 A1 | 10/2020 | Hammerschmidt et al. |
| 2020/0336313 A1 | 10/2020 | Knox |
| 2020/0336318 A1 | 10/2020 | Garg et al. |
| 2020/0336907 A1 | 10/2020 | Jain |
| 2020/0344074 A1 | 10/2020 | Främling et al. |
| 2020/0348924 A1 | 11/2020 | Park et al. |
| 2020/0351089 A1 | 11/2020 | Wentz |
| 2020/0351098 A1 | 11/2020 | Wentz |
| 2020/0351657 A1 | 11/2020 | Wentz |
| 2020/0356085 A1 | 11/2020 | Wentz et al. |
| 2020/0372184 A1 | 11/2020 | Meirosu |
| 2020/0374129 A1 | 11/2020 | Dilles et al. |
| 2020/0374700 A1 | 11/2020 | Smith et al. |
| 2020/0412766 A1 | 12/2020 | Gu et al. |
| 2021/0012282 A1 | 1/2021 | Smith et al. |
| 2021/0012332 A1 | 1/2021 | Ow et al. |
| 2021/0012893 A1 | 1/2021 | Stahl et al. |
| 2021/0021407 A1 | 1/2021 | Weerasinghe et al. |
| 2021/0021429 A1 | 1/2021 | Truu et al. |
| 2021/0036867 A1 | 2/2021 | Attard et al. |
| 2021/0037008 A1 | 2/2021 | Swaminath et al. |
| 2021/0051146 A1 | 2/2021 | Stolbikov et al. |
| 2021/0065234 A1 | 3/2021 | Shrivastava et al. |
| 2021/0073661 A1 | 3/2021 | Matlick et al. |
| 2021/0075623 A1 | 3/2021 | Petersen |
| 2021/0083873 A1 | 3/2021 | Harris |
| 2021/0099573 A1 | 4/2021 | Van Rensburg et al. |
| 2021/0119807 A1 | 4/2021 | Chen et al. |
| 2021/0124905 A1 | 4/2021 | Chen et al. |
| 2021/0126775 A1 | 4/2021 | Tichy |
| 2021/0135862 A1 | 5/2021 | Morales |
| 2021/0141830 A1 | 5/2021 | Tanner |
| 2021/0152372 A1 | 5/2021 | Hunt et al. |
| 2021/0160056 A1 | 5/2021 | Yan |
| 2021/0174360 A1 | 6/2021 | Davies et al. |
| 2021/0174634 A1 | 6/2021 | Purohit et al. |
| 2021/0176077 A1 | 6/2021 | Zhang |
| 2021/0178697 A1 | 6/2021 | Nilakantan |
| 2021/0184842 A1 | 6/2021 | Nix |
| 2021/0184857 A1 | 6/2021 | Chen et al. |
| 2021/0233058 A1 | 7/2021 | Mandaara et al. |
| 2021/0263907 A1 | 8/2021 | Krueger |
| 2021/0263908 A1 | 8/2021 | Saito |
| 2021/0273804 A1 | 9/2021 | Khan |
| 2021/0279014 A1 | 9/2021 | Kim et al. |
| 2021/0281421 A1 | 9/2021 | Semenovskiy et al. |
| 2021/0314143 A1 | 10/2021 | Conner |
| 2021/0314155 A1 | 10/2021 | Novotny |
| 2021/0314161 A1 | 10/2021 | Voit et al. |
| 2021/0319441 A1 | 10/2021 | Knobel |
| 2021/0320914 A1 | 10/2021 | Pillai |
| 2021/0352070 A1 | 11/2021 | Charvet et al. |
| 2021/0356279 A1 | 11/2021 | Szigeti |
| 2021/0365939 A1 | 11/2021 | Xiao |
| 2021/0377006 A1 | 12/2021 | Chau et al. |
| 2021/0390196 A1 | 12/2021 | Lavine et al. |
| 2021/0390578 A1* | 12/2021 | Calabrese .......... G06Q 30/0246 |
| 2021/0391993 A1 | 12/2021 | Walker |
| 2022/0004654 A1 | 1/2022 | Patel et al. |
| 2022/0014389 A1 | 1/2022 | Nix |
| 2022/0021537 A1 | 1/2022 | Wagner et al. |
| 2022/0027352 A1 | 1/2022 | Teodor et al. |
| 2022/0078023 A1 | 3/2022 | Nicolas et al. |
| 2022/0131857 A1 | 4/2022 | Nolte et al. |
| 2022/0191035 A1 | 6/2022 | Tucker et al. |
| 2022/0203933 A1 | 6/2022 | Wang |
| 2022/0222366 A1 | 7/2022 | Nagaraja et al. |
| 2022/0231868 A1 | 7/2022 | Horst |
| 2022/0253555 A1 | 8/2022 | Chopra et al. |
| 2022/0337562 A1 | 10/2022 | Sonawalla et al. |
| 2022/0405800 A1 | 12/2022 | Walcott et al. |
| 2023/0006993 A1 | 1/2023 | Bilgin et al. |
| 2023/0055618 A1 | 2/2023 | Jakobsson et al. |
| 2023/0073437 A1 | 3/2023 | Wang et al. |
| 2023/0074590 A1 | 3/2023 | Chen |
| 2023/0075884 A1 | 3/2023 | Jakobsson et al. |
| 2024/0129288 A1 | 4/2024 | Zhou et al. |

OTHER PUBLICATIONS

"U.S. Appl. No. 17/477,383, Examiner Interview Summary mailed Oct. 11, 2023", 2 pgs.
"U.S. Appl. No. 17/477,383, Non Final Office Action mailed Jul. 5, 2023", 9 pgs.
"U.S. Appl. No. 17/477,383, Notice of Allowance mailed Nov. 8, 2023", 8 pgs.
"U.S. Appl. No. 17/477,383, Response filed Oct. 4, 2023 to Non Final Office Action mailed Jul. 5, 2023", 11 pgs.
"U.S. Appl. No. 17/491,222, Examiner Interview Summary mailed May 9, 2023", 2 pgs.
"U.S. Appl. No. 17/491,222, Examiner Interview Summary mailed Oct. 11, 2023", 2 pgs.
"U.S. Appl. No. 17/491,222, Final Office Action mailed Jul. 11, 2023", 19 pgs.
"U.S. Appl. No. 17/491,222, Non Final Office Action mailed Feb. 15, 2023", 18 pgs.
"U.S. Appl. No. 17/491,222, Non Final Office Action mailed Dec. 11, 2023", 22 pgs.
"U.S. Appl. No. 17/491,222, Response filed May 15, 2023 to Non Final Office Action mailed Feb. 15, 2023", 11 pgs.

(56)        References Cited

OTHER PUBLICATIONS

"U.S. Appl. No. 17/491,222, Response filed Oct. 11, 2023 to Final Office Action mailed Jul. 11, 2023", 10 pgs.

"U.S. Appl. No. 17/491,251, Non Final Office Action mailed Jan. 19, 2024", 15 pgs.

"U.S. Appl. No. 17/491,319, Examiner Interview Summary mailed Jan. 10, 2024", 2 pgs.

"U.S. Appl. No. 17/491,319, Examiner Interview Summary mailed Aug. 14, 2023", 3 pgs.

"U.S. Appl. No. 17/491,319, Final Office Action mailed Oct. 24, 2023", 9 pgs.

"U.S. Appl. No. 17/491,319, Non Final Office Action mailed May 24, 2023", 21 pgs.

"U.S. Appl. No. 17/491,319, Response filed Jan. 22, 2024 to Final Office Action mailed Oct. 24, 2023", 9 pgs.

"U.S. Appl. No. 17/491,319, Response filed Aug. 14, 2023 to Non Final Office Action mailed May 24, 2023", 10 pgs.

"U.S. Appl. No. 17/513,345, Examiner Interview Summary mailed Sep. 15, 2023", 2 pgs.

"U.S. Appl. No. 17/513,345, Final Office Action mailed Jun. 14, 2023", 10 pgs.

"U.S. Appl. No. 17/513,345, Non Final Office Action mailed Nov. 20, 2023", 11 pgs.

"U.S. Appl. No. 17/513,345, Non Final Office Action mailed Dec. 8, 2022", 8 pgs.

"U.S. Appl. No. 17/513,345, Response filed Mar. 8, 2023 to Non Final Office Action mailed Dec. 8, 2022", 9 pgs.

"U.S. Appl. No. 17/513,345, Response filed Sep. 14, 2023 to Final Office Action mailed Jun. 14, 2023", 9 pgs.

"User Privacy and Data Use", Apple Developer App Store, [Online] Retrieved from the Internet: <URL:https://web.archive.org/web/20200816213212/https://developer.apple.com/app-store/user-privacy-and-data-use/>, (captured Aug. 16, 2020), 3 pgs.

Buddhavarapu, Prasad, et al., "Private matching for compute: New solutions to the problem of enabling compute on private set intersections", Facebook Engineering, [Online] Retrieved from the Internet: <URL: https://engineering.fb.com/open-source/private-matching/>, (Jul. 10, 2020), 13 pgs.

Ion, Mihaela, et al., "Private Intersection-Sum Protocol with Applications to Attributing Aggregate Ad Conversions", IACR Cryptol. ePrint Arch., 738, (2017), 14 pgs.

Paparo, ARI, "IDFA Apocalypse: What We Know (And Don't)", AdExchanger, [Online] Retrieved from the Internet: <URL: https://www.adexchanger.com/data-driven-thinking/idfa-apocalypse-what-we-know-and-dont/>, (Jul. 14, 2020), 10 pgs.

"U.S. Appl. No. 17/491,251, Notice of Allowance mailed Jun. 3, 2025", 5 pgs.

"U.S. Appl. No. 17/491,288, Final Office Action mailed Jun. 9, 2025", 19 pgs.

"U.S. Appl. No. 17/491,288, Response filed Apr. 25, 2025 to Non Final Office Action mailed Jan. 30, 2025", 9 pgs.

Reddy, K. Srinivasa, et al., "A Novel Dynamic Order-Preserving Encryption Scheme", IEEE, (2014), 92-96.

Shekhawat, Hema, et al., "Privacy-Preserving Techniques for Big Data Analysis in Cloud", 2019 Second International Conference on Advanced Computational and Communication Paradigms (ICACCP), (2019), 6 pgs.

"U.S. Appl. No. 17/477,383, Corrected Notice of Allowability mailed Feb. 22, 2024", 3 pgs.

"U.S. Appl. No. 17/491,222, Corrected Notice of Allowability mailed May 15, 2024", 2 pgs.

"U.S. Appl. No. 17/491,222, Examiner Interview Summary mailed Mar. 4, 2024", 2 pgs.

"U.S. Appl. No. 17/491,222, Notice of Allowance mailed Apr. 19, 2024", 10 pgs.

"U.S. Appl. No. 17/491,222, Response filed Feb. 28, 2024 to Non Final Office Action mailed Dec. 11, 2023", 12 pgs.

"U.S. Appl. No. 17/491,251, Corrected Notice of Allowability mailed Feb. 13, 2025", 2 pgs.

"U.S. Appl. No. 17/491,251, Examiner Interview Summary mailed Oct. 16, 2024", (2 pgs).

"U.S. Appl. No. 17/491,251, Final Office Action mailed Aug. 14, 2024", 11 pgs.

"U.S. Appl. No. 17/491,251, Notice of Allowance mailed Jan. 31, 2025", 17 pgs.

"U.S. Appl. No. 17/491,251, Response filed May 20, 2024 to Non Final Office Action mailed Jan. 19, 2024", 8 pgs.

"U.S. Appl. No. 17/491,251, Response filed Oct. 23, 2024 to Final Office Action mailed Aug. 14, 2024", 10 pgs.

"U.S. Appl. No. 17/491,288, Examiner Interview Summary mailed Mar. 19, 2025", 2 pgs.

"U.S. Appl. No. 17/491,288, Examiner Interview Summary mailed Dec. 30, 2024", 2 pgs.

"U.S. Appl. No. 17/491,288, Final Office Action mailed Oct. 9, 2024", 18 pgs.

"U.S. Appl. No. 17/491,288, Non Final Office Action mailed Jan. 30, 2025", 19 pgs.

"U.S. Appl. No. 17/491,288, Non Final Office Action mailed Mar. 28, 2024", 19 pgs.

"U.S. Appl. No. 17/491,288, Response filed Jan. 2, 2025 to Final Office Action mailed Oct. 9, 2024", 9 pgs.

"U.S. Appl. No. 17/491,288, Response filed Jun. 27, 2024 to Non Final Office Action mailed Mar. 28, 2024", 9 pgs.

"U.S. Appl. No. 17/491,319, Notice of Allowance mailed Mar. 13, 2024", 20 pgs.

"U.S. Appl. No. 17/513,345, Examiner Interview Summary mailed Feb. 16, 2024", 2 pgs.

"U.S. Appl. No. 17/513,345, Notice of Allowance mailed May 13, 2024", 8 pgs.

"U.S. Appl. No. 17/513,345, Response filed Feb. 20, 2024 to Non Final Office Action mailed Nov. 20, 2023", 11 pgs.

Chandra, Sourabh, et al., "Content Based Double Encryption Algorithm Using Symmetric Key Cryptography", Procedia Computer Science 57, (2015), 1228-1234.

Hu, K., "Many-To-One Private Set Intersection", Iowa State University, (2017), 35 pgs.

Jennings. C., et al., "RFC 8723 Double Encryption Procedures for the Secure Readi-Time Transport Protocol (SRTP)", (Apr. 2020). 1-18.

Rodriguez-Lopez, Fidel, et al., "A Hardware Assisted Implementation of Time Varying Encryption System", IEEE, pp. 1-6 (Year: 2018), 6 pgs.

Swamidass, S. Joshua, et al., "Securely Measuring the Overlap Between Private Datasets with Cryptosets", PLOS One, (Feb. 25, 2015), 18 pgs.

Watanabe, Hidenobu, et al., "Improvement of the Integrity Verification Application using Timestamp Mechanism for Distributed File System", 2014 IEEE 38th Annual International Computers, Software and Applications Conference Workshops, (2014), 158-163.

Xie, Qi, et al., "Hash Function and Smart Card Based Multi-Server Authentication Protocol", 2010 WASE International Conference on Informaiton Engineering, IEEE Computer Society, 3 pgs.

"U.S. Appl. No. 17/491,251, Corrected Notice of Allowability mailed Sep. 10, 2025", 2 pgs.

"U.S. Appl. No. 17/491,251, Notice of Allowance mailed Oct. 14, 2025", 5 pgs.

"U.S. Appl. No. 17/491,288, Examiner Interview Summary mailed Aug. 4, 2025", 2 pgs.

"U.S. Appl. No. 17/491,288, Non Final Office Action mailed Aug. 28, 2025", 21 pgs.

"U.S. Appl. No. 17/491,288, Response filed Aug. 1, 2025 to Final Office Action mailed Jun. 9, 2025", 9 pgs.

Chen, et al., "Fast Private Set Intersection from Homomorphic Encryption", In Proceedings of the 2017 Conference on Computer and Communications Security, (Apr. 3, 2017), 19 pgs.

* cited by examiner

Figure 2:
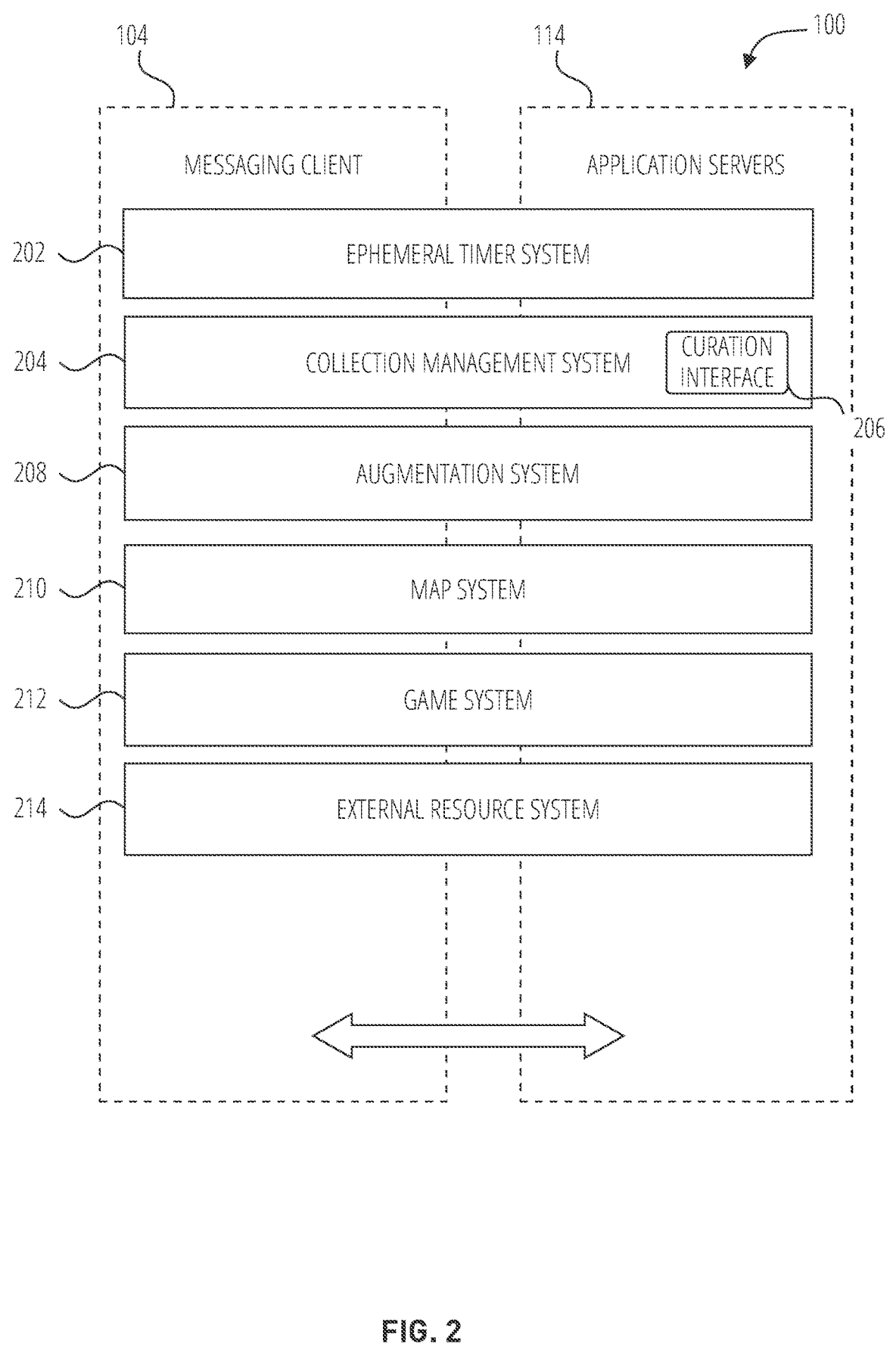

104

114

100

MESSAGING CLIENT

APPLICATION SERVERS

202 — EPHEMERAL TIMER SYSTEM

204 — COLLECTION MANAGEMENT SYSTEM

CURATION INTERFACE

206

208 — AUGMENTATION SYSTEM

210 — MAP SYSTEM

212 — GAME SYSTEM

214 — EXTERNAL RESOURCE SYSTEM

PROFILE DATA

ENTITY
GRAPH

308

310

MESSAGE
TABLE

302

ENTITY
TABLE

306

AUGMENTATION
TABLE

304

STORY TABLE

VIDEO
TABLE

IMAGE
TABLE

312

314

IMPRESSION
DATA TABLE

318

CONVERSION
DATA TABLE

320

DATABASE

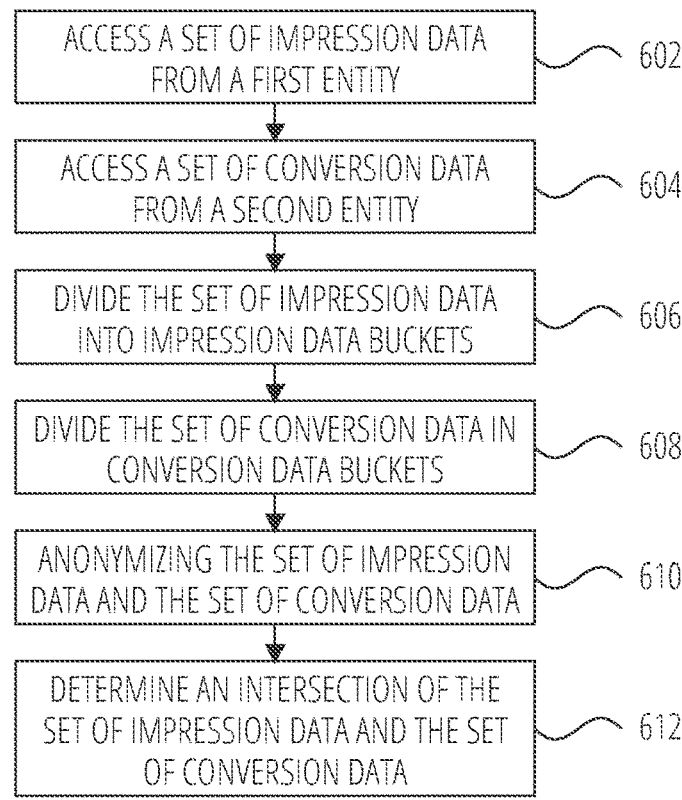
FIG. 6

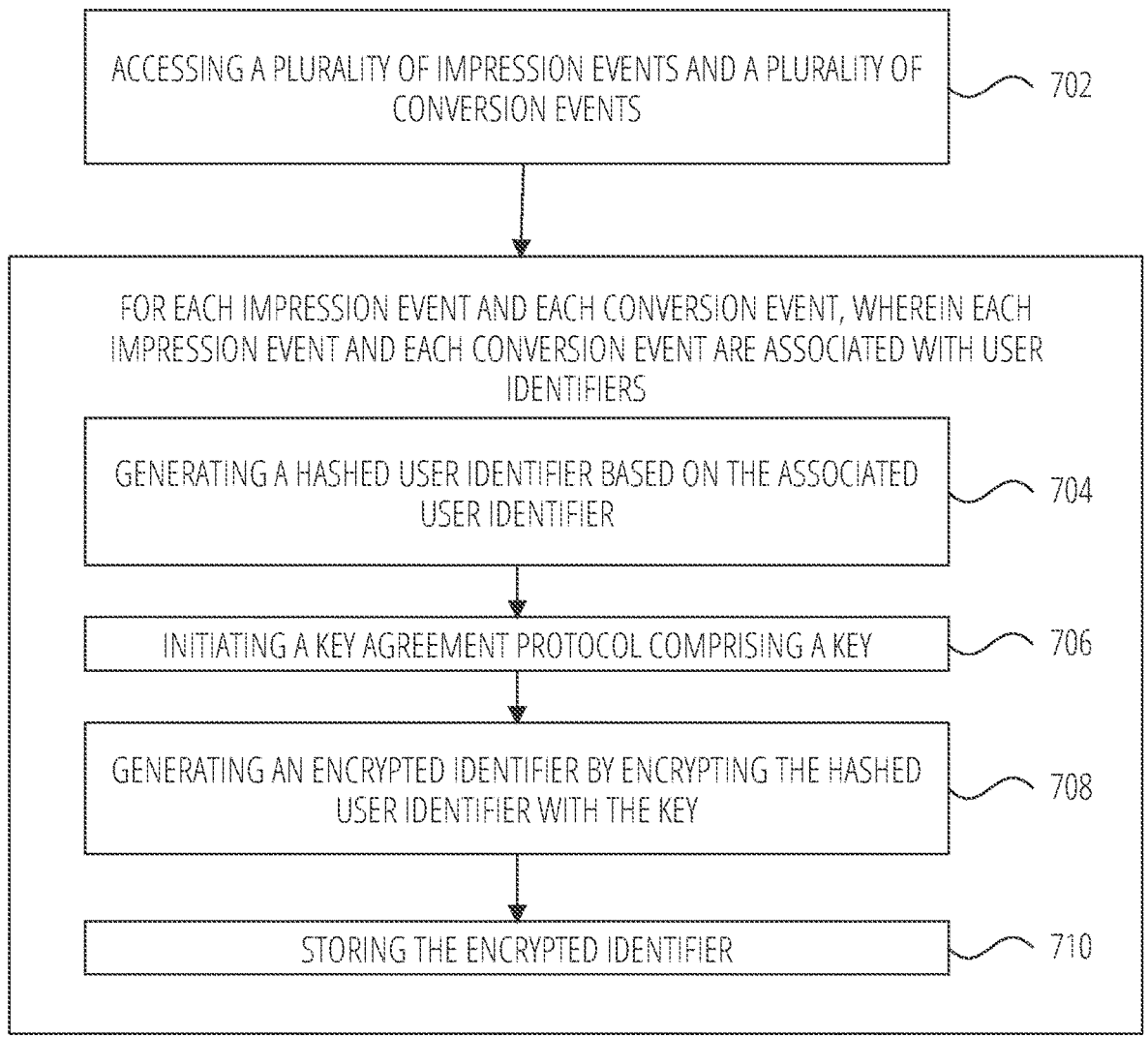

ACCESSING A PLURALITY OF IMPRESSION EVENTS AND A PLURALITY OF CONVERSION EVENTS — 702

FOR EACH IMPRESSION EVENT AND EACH CONVERSION EVENT, WHEREIN EACH IMPRESSION EVENT AND EACH CONVERSION EVENT ARE ASSOCIATED WITH USER IDENTIFIERS

GENERATING A HASHED USER IDENTIFIER BASED ON THE ASSOCIATED USER IDENTIFIER — 704

INITIATING A KEY AGREEMENT PROTOCOL COMPRISING A KEY — 706

GENERATING AN ENCRYPTED IDENTIFIER BY ENCRYPTING THE HASHED USER IDENTIFIER WITH THE KEY — 708

STORING THE ENCRYPTED IDENTIFIER — 710

FIG. 7

PRIVACY-PRESERVING MULTI-TOUCH ATTRIBUTION

CROSS-REFERENCE TO RELATED APPLICATIONS

This application is a continuation of U.S. patent application Ser. No. 17/477,383, filed Sep. 16, 2021, which claims the benefit of priority to U.S. Provisional Application Ser. No. 62/706,902, filed Sep. 16, 2020, which is incorporated herein by reference in its entirety.

TECHNICAL FIELD

The subject matter referred to herein generally relate to data analysis. Specifically, but not by way of limitations, systems and methods herein describe advanced matching methods between datasets.

BACKGROUND

User privacy in mobile applications and web applications is a leading concern for application developers and users alike. While user or device data is collected from applications (web and mobile) for targeted advertisement or advertising measurement purposes, there has been a growing need for enhanced privacy technologies to ensure user privacy.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which:

FIG. 2 is a diagrammatic representation of a messaging system, in accordance with some examples, that has both client-side and server-side functionality.

FIG. 6 illustrates a method for advanced matching between datasets, in accordance with one embodiment.

FIG. 7 is a flowchart of a method for conducting privacy preserving multi-touch attribution, according to example embodiments.

DETAILED DESCRIPTION

Figure 1:
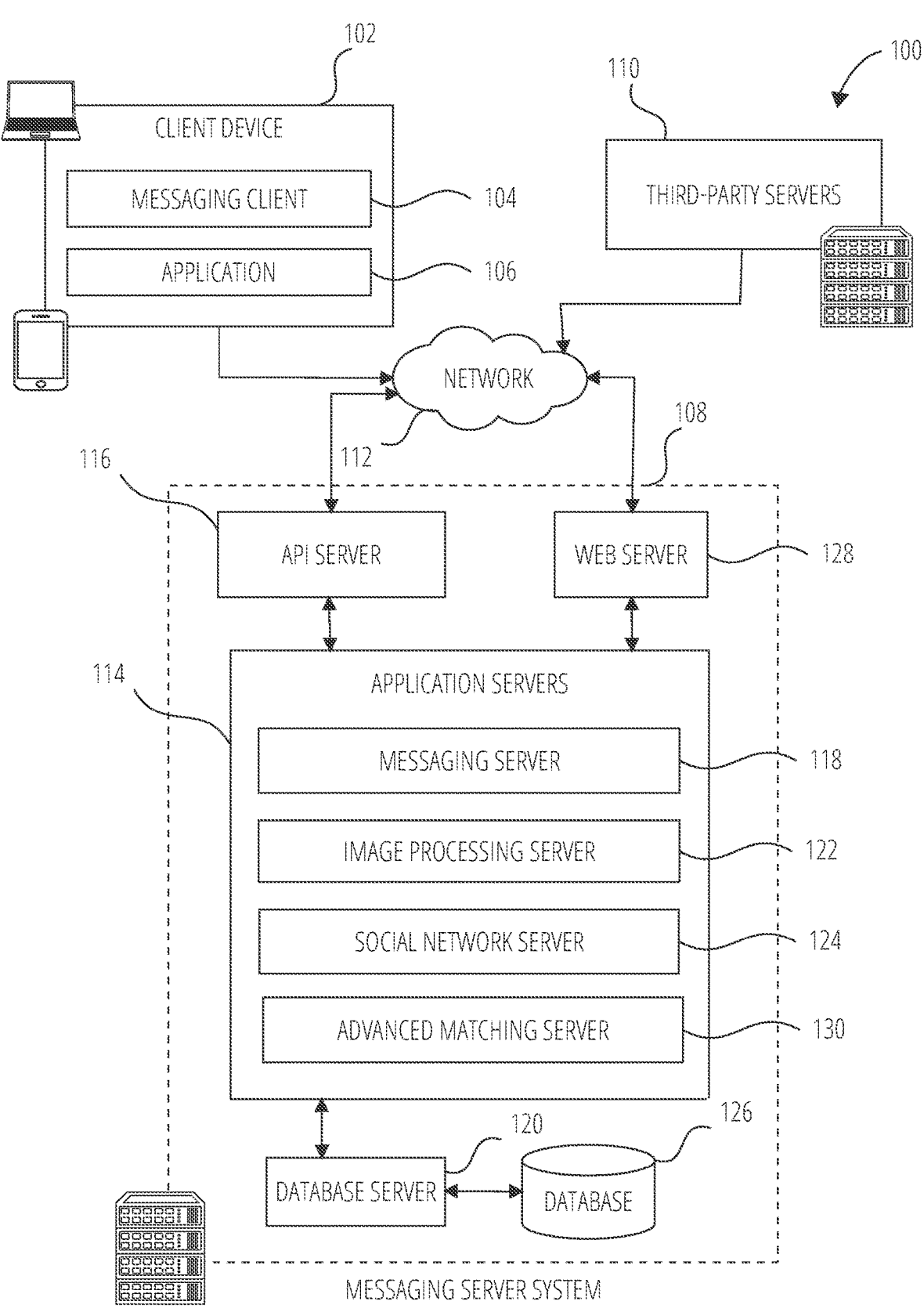
FIG. 1 is a diagrammatic representation of a networked environment in which the present disclosure may be deployed, in accordance with some examples.

Online advertising falls within two categories: brand advertising and direct response advertising. While the purpose behind brand advertising is to make potential customers aware of a brand, direct response advertising focuses on immediate actions in response to an advertisement. A business measures the efficiency of their advertising tactics by analyzing various datasets and performing analysis using those datasets.

One such dataset is the impression data. An impression in the context of online advertising is when an advertisement is fetched from its source (e.g., an advertising server) and is countable. For example, if an advertisement is displayed on a webpage or within a mobile application, then the impression for the advertisement is counted. The impression data may be generated by the business.

Another valuable dataset is the conversion data. A successful conversion is defined by individual businesses and advertisers. For example, a successful conversion for one business may be defined by a sale of a product. A successful conversion for another business may be defined by downloading an application. Often times a business receives the conversion data from a third-party entity. For example, the third-party entity may be a modern marketing partner (MMP).

Businesses may perform analysis using the conversion data and impression data to determine the efficiency of their advertising tactics by computing three specific metrics: Attribution, Lift and Ranking. Attribution refers to the identification of a set of user actions that contribute to a desired outcome. For example, attribution provides insight into what combination of user actions and what specific order of these user actions influence users to engage in a desired behavior (e.g., the conversion). Lift represents an increase in sales in response to some form of advertising. Ranking is a value that is used to determine the position of the advertisement relative to other advertisements and whether the advertisement will be displayed.

As user privacy becomes a growing concern, users may no longer opt in to share user or device information with third parties. For example, while some users may opt in to share identifiable information for advertisement tracking (e.g., via web cookies), others may opt out of advertisement tracking capabilities.

The following paragraphs provide a technical solution for matching records in different datasets while maintaining the privacy of each dataset.

An advanced matching system places the impression and conversion datasets into separate data buckets. The advanced matching system further implements minimum bucket sizes to ensure privacy is kept for users. After generating the buckets, the advanced matching system implements an identifier collection process. For example, the advanced matching system constructs a user identifier by concatenating data fields (e.g., email address and phone number). The user identifier is subsequently hashed. In order to maximize the likelihood of a match, the advanced matching system uses multiple identifiers. The advanced matching system then computes the intersection of the conversion dataset and the impression dataset.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, a social network server 124, and an advanced matching server 130. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
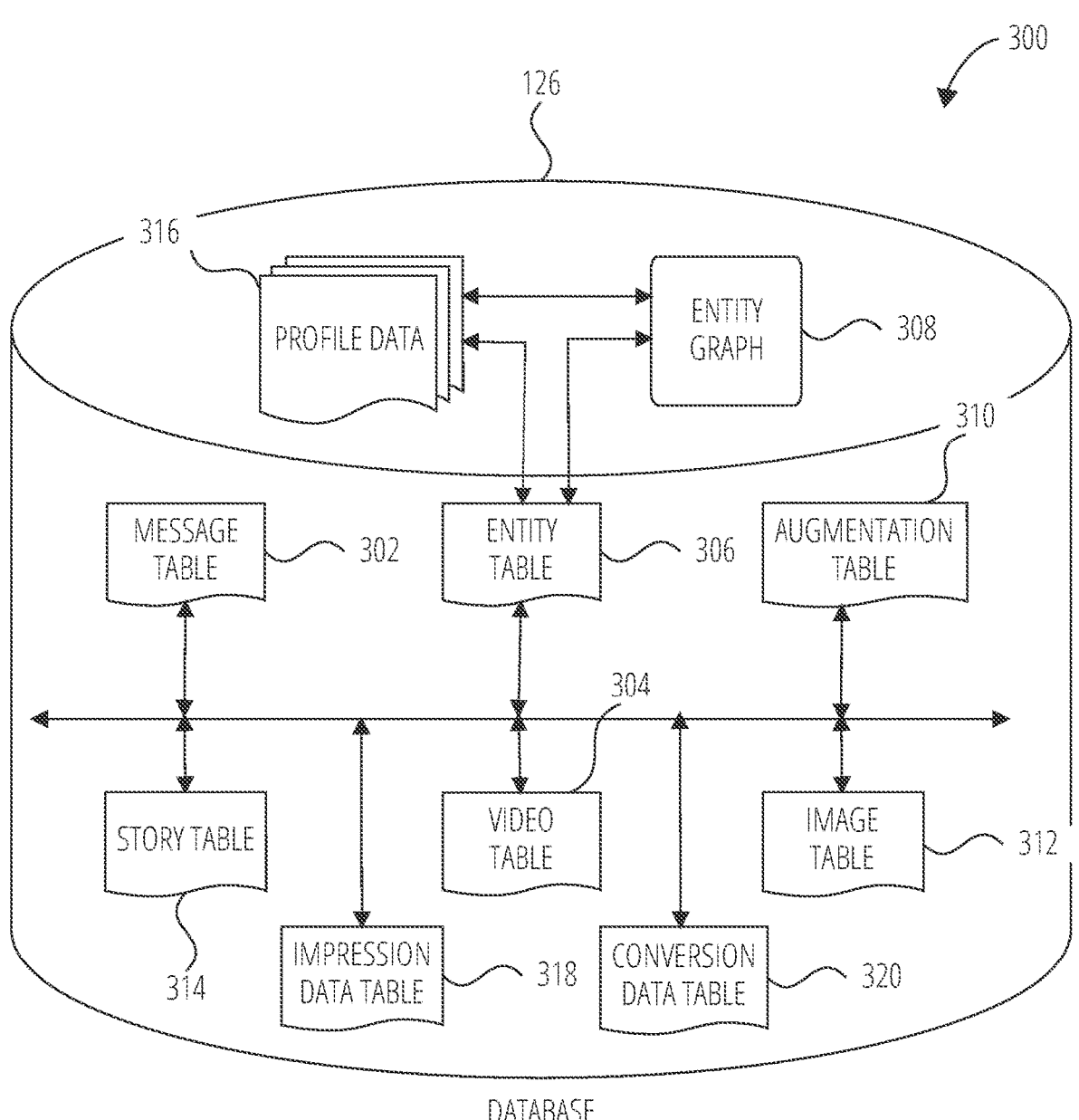
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

The advanced matching server 130 performs an advanced matching of records in different datasets while maintaining the privacy of each dataset.

Returning to the messaging client 104, features and functions of an external resource (e.g., an application 106 or applet) are made available to a user via an interface of the messaging client 104. In this context, "external" refers to the fact that the application 106 or applet is external to the messaging client 104. The external resource is often provided by a third party but may also be provided by the creator or provider of the messaging client 104. The messaging client 104 receives a user selection of an option to launch or access features of such an external resource. The external resource may be the application 106 installed on the client device 102 (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104 and, in some examples, no or limited portions of the small-scale application can be accessed outside of the messaging client 104. The small-scale application can be launched by the messaging client 104 receiving, from a third-party server 110 for example, a markup-language document associated with the small-scale application and processing such a document.

In response to determining that the external resource is a locally-installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, cach using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the sever-side by the application servers 114. These subsystems include, for example, an ephemeral timer system 202, a collection management system 204, an augmentation system 208, a map system 210, a game system 212, and an external resource system 214.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The external resource system 214 provides an interface for the messaging client 104 to communicate with remote servers (e.g., third-party servers 110) to launch or access external resources, i.e. applications or applets. Each third-party server 110 hosts, for example, a markup language (e.g., HTML5) based application or small-scale version of an application (e.g., game, utility, payment, or ride-sharing application). The messaging client 104 may launches a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given external resource access to certain user data of the messaging client 104. HTML5 is used as an example technology for programming games, but applications and resources programmed based on other technologies can be used.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., applications 106 or applets and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between third-party servers 110 and the messaging client 104. In certain examples, a Web ViewJavaScript Bridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale applications (e.g., an application 106) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

In some examples, components of the advanced matching server 130 is implemented on the messaging client 104. In some examples, components of the advanced matching server 130 is implemented on the application servers 114.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

The database 126 can also store impression data in the impression data table 318 and conversion data in the conversion data table 320 for use by the advanced matching server 130.

Data Communications Architecture

Figure 4:
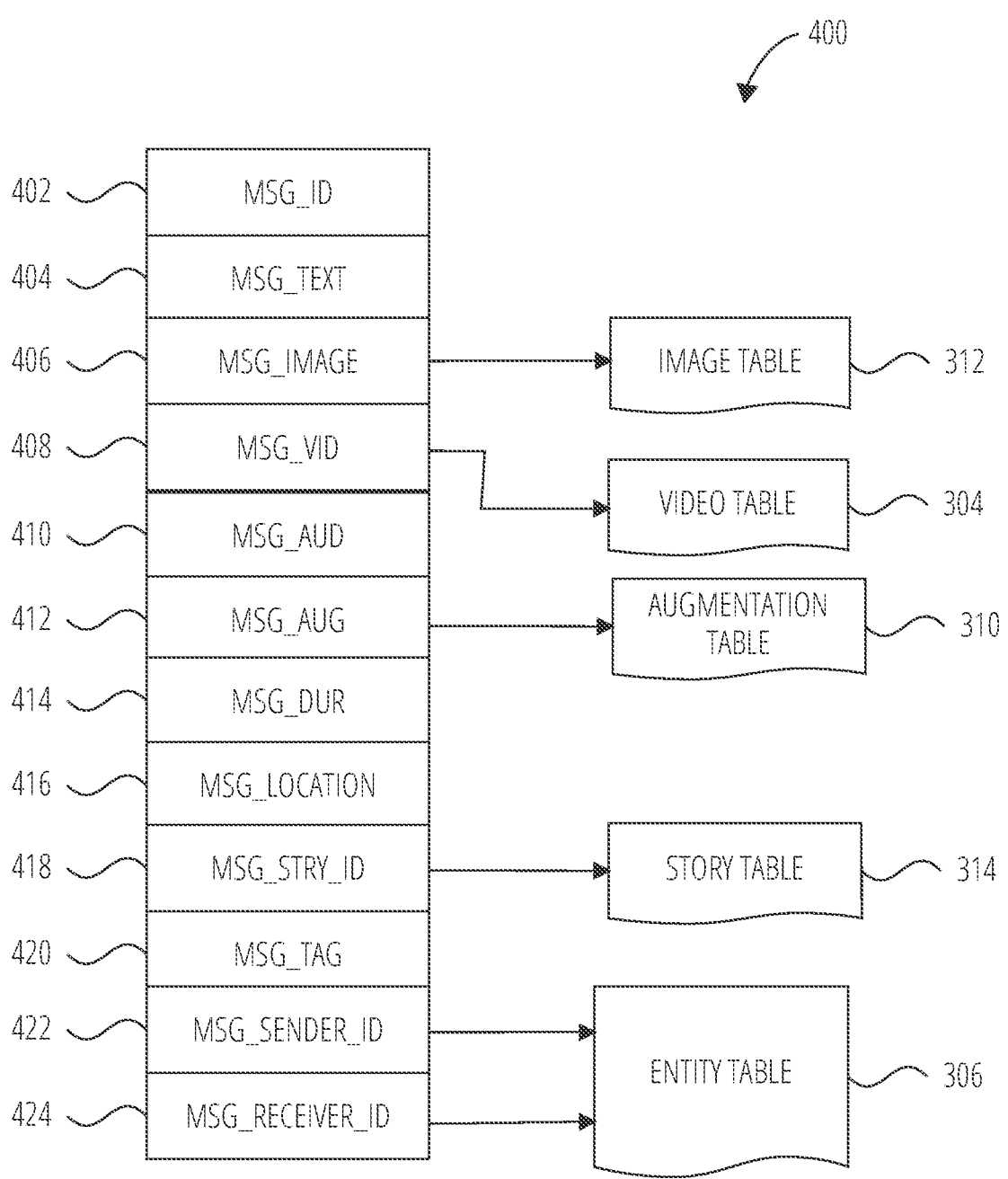
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 312.

message video payload 408: video data, captured by a camera component or retrieved from a memory component of the client device 102, and that is included in the message 400. Video data for a sent or received message 400 may be stored in the video table 304.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.

message tag 420: cach message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the Client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentations 412 may point to data stored in an augmentation table 310, values stored within the message story identifier 418 may point to data stored in a story table 314, and values stored within the message sender identifier 422 and the message receiver identifier 424 may point to user records stored within an entity table 306.

Time-Based Access Limitation Architecture

Figure 5:
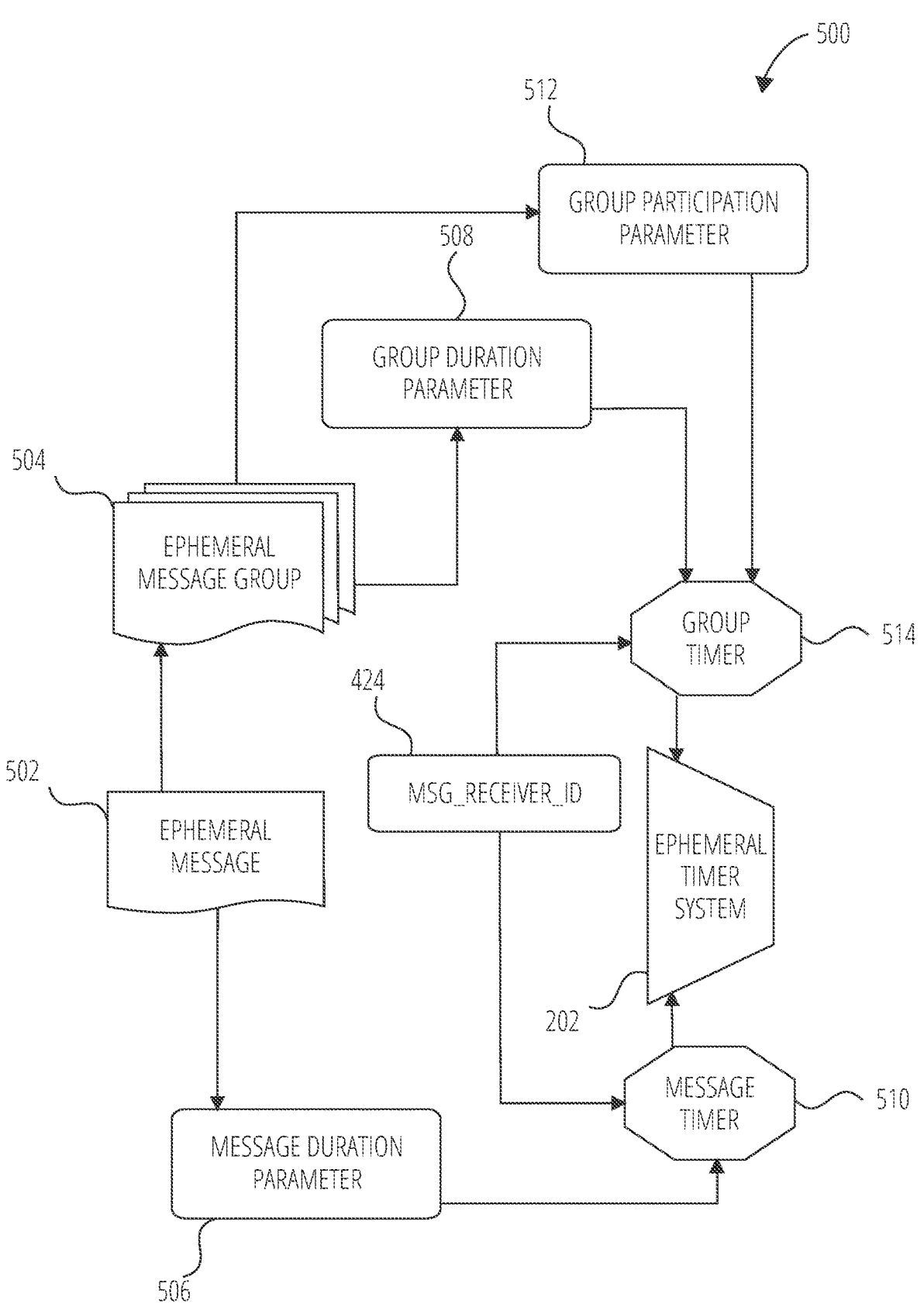
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 510, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 510 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 512, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 512, and message receiver identifier 424 cach provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 512. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 512. For example, when a sending user has established a group participation parameter 512 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 512 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 512 for the last remaining ephemeral message 502 within the ephemeral message group 504 will determine when the ephemeral message group 504 itself expires. In this case, a new ephemeral message 502, added to the ephemeral message group 504, with a new group participation parameter 512, effectively extends the life of an ephemeral message group 504 to equal the value of the group participation parameter 512.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

FIG. 6 is a flowchart of an example method 600 for advanced matching between datasets, according to example embodiments. In one example, the processor in an advanced matching server 130, the processor in a client device 102, or any combination thereof can perform the operations in the method 600.

At operation 602, the advanced matching server 130 accesses a set of impression data from a first entity. At operation 604, the advanced matching server 130 accesses a set of conversion data from a second entity. In some examples, the first entity is a server system including the advanced matching server 130. The second entity may be communicatively coupled to the first entity (e.g., via a network 112).

At operation 606, the advanced matching server 130 divides the set of impression data into impression data buckets. In operation 608, the advanced matching server 130 divides the set of conversion data in conversion data buckets. The advanced matching server 130 further implements minimum bucket sizes to ensure privacy is kept for users. For example, the advanced matching server 130 implements a first threshold size of the impression data buckets and a second threshold size of the conversion data buckets.

At operation 610, the advanced matching server 130 anonymizing the impression data and the conversion data. For example, the advanced matching server 130 generates a first set of user identifiers based on users associated with the set of impression data and generates a second set of user identifiers based on users associated with the set of conversion data. For example, for each user identifier of the first set of user identifiers, the advanced matching server 130 identifies a primary data field (e.g., an email address) and a secondary data field (e.g., a phone number) associated with a user. The advanced matching server 130 concatenates the primary data field and secondary data field and generates the user identifier based on the concatenation.

The advanced matching server 130 further generates a first hashed set of user identifiers based on the first set of user identifiers and generates a second hashed set of user identifiers based on the second set of user identifiers.

At operation 612, the advanced matching server 130 determines an intersection of the set of impression data and the set of conversion data.

In one example, an advanced matching server 130 employs private set intersection to determine the intersection of the impression dataset and the conversion dataset. Private set intersection (PSI) is a cryptographic technique that allows two parties holding separate sets (e.g., datasets) to compare encrypted versions of those sets in order to compute the intersection. Neither party exposes any information to the other party except for the elements in the intersection of the two sets. For example, the advanced matching system performs PSI on the conversion dataset and the impression dataset. The result is a list of users or user devices that successfully engaged with an advertisement. In some examples, the advanced matching system generates the impression dataset.

In another example, an advanced matching server 130 employs a PSI-Sum technique to determine the intersection of the impression dataset and the conversion dataset. The PSI-Sum technique is used to generate a sum of values of the intersection dataset. For example, the intersection dataset (e.g., intersection of the impression dataset and the conversion dataset) includes a set of users. Each of the users may have a purchase value associated with them (e.g., a cost of a payment associated with the user). The PSI-Sum technique will result in the sum of the value (e.g., the purchase values) of all the users in the intersection data set.

In some examples, the advanced matching server 130 employs PSI-Sum technique with additive homomorphic encryption (HE) to determine the intersection of the impression dataset and the conversion dataset. A first entity learns an intersection size of the intersection dataset and a second entity learns a sum of values over the intersection data set. An advanced matching server 130 employing PSI-Sum using additive HE may perform the following operations: The first entity encrypts user identifiers using a private key $K_1$ and shuffles the identifiers. The second entity creates a pair (PK, SK) for additive HE and encrypts all values with PK. The second entity encrypts its identifiers using a private key $K_2$ and randomly shuffles ($Enc\_K_2(id)$, $Enc\_PK(value)$) pairs. The second entity re-encrypts the first entity's identifiers using $K_2$. The second entity transmits both encrypted sets to the first entity. The first entity re-encrypts the single encrypted set and determines an overlap between both double encrypted sets. For all intersected elements, the advanced matching system adds all the homomorphically encrypted ciphertexts to obtain CT=Enc_PK (value-sum). The first entity reports back the intersection count and the ciphertext, CT. The cyphertext can be decrypted to learn the value-sum in the clear.

In some examples, the advanced matching server 130 employs the PSI-Sum technique with Diffic-Hellman Encryption to determine the intersection of the impression dataset and the conversion dataset. A first entity learns an intersection size of the intersection dataset and a second entity learns a sum of values over the intersection data set. The advanced matching server 130 employing PSI-Sum using Diffie-Hellman Encryption may perform the following operations: The first entity encrypts the user identifiers using its private key $K_1$ and shuffles the user identifiers. The second entity encrypts its user identifiers and values associated with the user identifiers (plain or masked) using a private key $K_2$ and randomly shuffles ($Enc\_K_2(ID)$, $Enc\_K_2$ (value)) pairs. The second entity double encrypts the first entity's user identifiers using $K_2$. The second entity transmits both encrypted sets to the first entity. The first entity double encrypts the second entity's single encrypted set and determines the overlap between both double encrypted sets. For all the intersected elements, the first entity encrypts the values with key $K_1$, shuffles the elements and sends them back to the second entity. Thus the value for each intersected element is $Enc\_K_1(Enc\_K_2(value))$. The second entity removes its layer of encryption, shuffles the elements and sends it back to the first entity. The value for each intersected element is now, $Enc\_K_1(value)$. The first entity decrypts the value and determines a sum value over all the intersected elements. The first entity sends the sum value to the second entity.

In some examples, the advanced matching server 130 employs the PSI-Sum technique with masking to determine the intersection of the impression dataset and the conversion dataset. The second entity may transmit values to the first entity that are masked values.

In another example, the advanced matching server 130 employs a PSI-Size technique to implement the timestamp verification process. The PSI-Size technique compares encrypted versions of two sets in order to compute the intersection. However, rather than exposing the elements in the intersection of the two sets, the result is the number of elements in the intersection of the two sets. For example, the advanced matching system performs the PSI-Size on the conversion dataset and the impression dataset. The result is the number of users or user devices that successfully engaged with an advertisement.

Each conversion dataset entry has an associated conversion timestamp and each impression dataset entry has an associated impression timestamp. The advanced matching system only counts the conversion event if the associated conversion timestamp occurs after the impression timestamp. Thus, the advanced matching server 130 filters the intersection of the conversion set and the impression set based on a timestamp verification process.

In one example, the advanced matching server 130 employs the PSI-Size technique, described above, to implement the timestamp verification process. The PSI-Size technique compares encrypted versions of two sets in order to compute the intersection. However, rather than exposing the elements in the intersection of the two sets, the result is the number of elements in the intersection of the two sets. For example, the advanced matching server 130 performs the PSI-Size on the conversion dataset and the impression dataset. The result is the number of users or user devices that successfully engaged with an advertisement.

Consider the following example of an impression dataset from a first entity and conversion dataset from a second entity. In some examples, the first entity is a server system including the advanced matching system.

First Entity:

| Hashed Email | Age |
|---|---|
| H1 | 17 |
| H2 | 22 |
| H3 | 35 |
| H4 | 26 |

Second Entity:

| Hashed Email | Number of Purchases |
|---|---|
| H3 | 2 |
| H4 | 5 |
| H5 | 1 |

As shown above, the first entity and second entity have an intersection set comprising of the hashed emails H3 and H4. The advanced matching server 130 uses the PSI-Size technique to compute the size of the intersection set and also additive shares of values associated with the identifiers in the intersection:

First Entity Output:

| Pseudo Identifier | Share of Age | Share of Purchases |
|---|---|---|
| ID 1 | 55 | −15 |
| ID 2 | −34 | −11 |

Second Entity Output:

| Pseudo Identifier | Share of Age | Share of Purchases |
|---|---|---|
| ID 1 | −20 | 17 |
| ID 2 | 60 | 16 |

As shown above, the size of the intersection between the first entity dataset and the second entity dataset is 2.

Both entities learn the size of the intersection and the shares of age and purchase values. The pseudo identifiers cannot be tied to the original hashed emails.

First Entity Input:

| Hashed Email | Impression Timestamp |
| --- | --- |
| H1 | 10:05 |
| H2 | 10:13 |
| H3 | 10:27 |
| H4 | 10:42 |

Second Entity Input:

| Hashed Email | Conversion Timestamp |
| --- | --- |
| H3 | 10:33 |
| H4 | 10:38 |
| H5 | 1 |

The advanced matching server 130 may convert timestamps into integers between 0 to 2359. For example, 10:05 may be represented by the integer 1005 and 3:32 may be represented by the integer 332.

First Entity Output:

| First Entity Output: | | |
| --- | --- | --- |
| Psuedo Identifier | Share of Impression Time | Share of Conversion Time |
| ID 1 | 2100 | 500 |
| ID 2 | −458 | 438 |

Second Entity Output:

| Psuedo Identifier | Share of Impression Time | Share of Conversion Time |
| --- | --- | --- |
| ID 1 | −1073 | 533 |
| ID 2 | 1500 | 600 |

As shown above, the size of the intersection of the first entity output and the second entity output is 2.

Once both entities have their outputs, the second entity will choose a random value per row, add it to both the time shares and send the pair of values per row to the advanced matching system. For example, the second entity may choose 519 for row 1 and 663 for row 2 and send (−554, 1052), (2163, 1263) to the advanced matching server 130. The advanced matching server 130 reconstructs the randomized time values by adding each value sent by the second entity to the appropriate entry:

| Psuedo Identifier | Masked Impression Time | Masked Conversion Time |
| --- | --- | --- |
| ID 1 | 2100 = 554 = 1546 | 500 + 1052 = 1552 |
| ID 2 | −458 + 2163 = 1705 | 438 + 1263 = 1701 |

The advanced matching server 130 can only select the entries where the masked impression time is before the masked conversion time and output that as the final intersection value. In the above given example, that would only be one, because the condition is only true for ID 1.

Since the second entity (e.g., an MMP, third-party application) adds a random value to all the time stamps that is unknown to the advanced matching server 130, there is no way for the advanced matching server 130 to trace the pseudo identifier to the actual hashed email through the masked impression time.

In some examples, if the same user is shown an advertisement multiple times, that would create multiple entries in the impressions dataset for the same user. If that user later converts, then according to the above-described protocol, there will be multiple impression entries that match. In order to avoid this, the advanced matching server 130 can narrow down and trace back users by the number of impressions. For example, the advanced matching system can send only one impression entry (e.g., the earliest entry) per user. In other examples, the advanced matching system can cap the number of impressions and only send them in specific numbers (e.g., 1, 5, 10, etc.).

In another example, the advanced matching server 130 utilizes a bucketing technique to implement the timestamp verification process. For example, the advanced matching system may focus on a one-hour time interval from 10:00 to 11:00 with a granularity of 15 minutes. For the conversion events (e.g., each entry in the conversion dataset), the advanced matching system performs a PSI with all of the first entity hashed emails until that interval. For the aforementioned time interval, the advanced matching system can perform three modified PSI protocols as follows:

1. First entity hashed emails between 10:00-10:15 and second entity hashed emails between 10:15-10:30

2. First entity hashed emails between 10:00-10:30 and second entity hashed emails between 10:30-10:45

3. First entity hashed emails between 10:00-10:45 and second entity hashed emails between 10:45-11:00.

Thus, the advanced matching server 130 can extend the PSI size protocol as follows:

1. First entity chooses three encryption keys: fkey_1 for 10:00-10:15, fkey_2 for 10:00-10:30, and fkey_3 for 10:00-10:45

2. Second entity chooses three encryption keys: skey_1 for 10:15-10:30, skey_2 for 10:30-10:45, skey_3 for 10:45-1:00.

3. The first entity and the second entity now perform three PSI size protocols with the three keys and the set of hashed emails in the time frame associated with the respective key.

In this example, the first entity re-encrypts its hashed emails under multiple keys. For example, a hashed email corresponding to an impression event at 10:07 will be encrypted under all three first entity keys and will be a part of all three protocols. It is understood that the advanced matching system may extend this solution to any time interval and the number of PSI size protocols that are required depends on the granularity. Any time interval can be broken into modified PSI protocols between the sets filtered by their timestamps:

| | PSI-Size Protocol 1 | PSI-Size Protocol 2 | PSI-Size Protocol 3 | PSI-Size Protocol 4 |
|---|---|---|---|---|
| First Entity Hashed Emails | Time T0-T4 | Time T0-T3 | Time T0-T2 | Time T0-T1 |
| Second Entity Hashed Emails | Time T4-T5 | Time T3-T4 | Time T2-T3 | Time T1-T2 |

In another example, the advanced matching server 130 uses order-preserving encryption (OPE) in conjunction with the modified PSI protocol to implement the timestamp verification process. OPE is a type of encryption that encrypts values so that the relative ordering of plaintext messages is preserved in the ciphertext values. OPE satisfies the property that if $x<y$ then $OPE(x)<OPE(y)$.

Let $\{(h1, t1), (h2, t2), (h3, t3), (h4, t4)\}$ be the set of first entity hashed emails along with the respective impression timestamps (referred to as Set 1) and $\{(h3, t3'), (h4, t4'), (h5, t5')\}$ be the set of second entity hashed emails along with the respective conversion timestamps (referred to as Set 2). The first entity sends Set 1 encrypted under its private key and sends associated timestamps in clear:

$$E(\text{Set } 1)=\{(F\_Enc(h1),t1),(F\_Enc(h2),t2),(F\_Enc(h3),t3),(F\_Enc(h4),t4)\}$$

The second entity sends Set 2 encrypted under its key and also double encrypts the set sent by the first entity under its own key. It encrypts the timestamps associated with both the sets using an OPE scheme and sends the encrypted timestamps as well.

$$E(\text{Set } 2)=\{(S\_Enc(h3),OPE(t3')),(S\_Enc(h4),OPE(h4')),(S\_Enc(h5),OPE(h5'))\}$$

$$E(E(\text{Set } 1))=\{(S\_Enc(F\_Enc(h1)),OPE(t1)),(S\_Enc(F\_Enc(h2)),OPE(t2)),(S\_Enc(F\_Enc(h3)),OPE(t3)),(S\_Enc(F\_Enc(h4)),OPE(t4))\}$$

The first entity double encrypts Set 2 to compute:

$$E(E(\text{Set } 2)=\{F\_Enc(S\_Enc(h3)),F\_Enc(S\_Enc(h4)),F\_Enc(S\_Enc(h5))\}$$

The first entity can now compare the two sets $E(E(\text{Set } 1))$ with $E(E(\text{Set } 2))$ to identify the number of users that are in the intersection. Also for any element h that interests, the first entity will include them only if the timestamp check passes for the associated encrypted timestamps:

$$\text{Count } F\_Enc(S\_Enc(h)) \text{ iff } OPE(t)<OPE(t')$$

FIG. 7 is a method for conducting privacy preserving multi-touch attribution, according to example embodiments. In one example, the processor in an advanced matching server 130, the processor in a client device 102, or any combination thereof can perform the operations in the method shown in FIG. 7.

At operation 702, the advanced matching server 130 accesses a plurality of impression events a plurality of conversion events. For each impression event and each conversion event, wherein each impression event and each conversion event are associated with user identifiers, the advanced matching server 130 generates a hashed user identifier based on the associated user identifier at operation 704, initiates a key agreement protocol comprising a key at operation 706, generates an encrypted identifier by encrypting the hashed user identifier with the key at operation 708, and stores the encrypted user identifier at operation 710. In some examples, the encrypted identifier is transmitted to an MMP. Further details on operations 702-210 are described in the paragraphs below.

Typically, a conversion event, such as a product purchase or an application installation is associated with multiple impression events. For example, a user may see an advertisement for a product from Company Z on Company A's website, Company B's mobile application and Company C's website before buying the product from Company Z. An advertiser may choose different attribution models (e.g., first touch, last touch, time decay, etc.) for an advertising campaign and the different platforms (e.g., Company A's website and Company B's mobile application, Company C's website) may be credited accordingly.

The entity that links the conversion events to different impression events may be a third-party such as an MMP. In some examples, the third-party entity may track users using user data to link the conversion events to different impression events. In another example, each advertiser and platform with an active advertising campaign will share a unique key. The key may be refreshed periodically. The impression events and conversion events may be encrypted under this key before being sent to the third-party. The third-party will be able to link the impression events and conversion events only through encrypted identifiers.

The encrypted identifiers allow linking of the impression events and conversion events without explicit linking of any user data. The third-party may subsequently return aggregate values back to the advertisers and platforms.

In some examples, all parties (e.g., platforms and advertisers) run a key agreement protocol to agree on a key, K. For all impression and conversion events to be sent to another party, each party encrypts a user identifier under the key, K to generate an encrypted identifier. In some examples, the user identifier may include email addresses, and phone numbers. It is understood than any other suitable user identifier may be used.

For each conversion event with a specific encrypted identifier, the MMP retrieves all relevant impression events in the desired lookback window. Depending on the advertiser's attribution model, the MMP credits the conversion events to the corresponding platforms.

In some examples, a first key agreement protocol is used among all parties. One party chooses a random symmetric key or a fresh salt and communicates the key to other participants in the protocol. In some examples, the key is communicated to all other participants except the MMP. The key is sent to the other participants and is encrypted under their respective public keys.

In another example, a second key agreement protocol is used among all parties. Each party sends their own random key, $K\_i$, encrypted under their public key, to every other party. The final key K is computed as a function of $K\_1, \ldots, K\_N$. For example, the final key K may be an "exclusive or" (e.g., XOR) operation of all the N keys.

In another example, a third key agreement protocol is used among all parties. Each party, i, chooses their own random key, $K\_i$. They first send a hashed random key $H(K\_i)$, encrypted under their public key, to every other party in the protocol. Once everyone in the protocol receives the hashed random keys, each party sends their own random key encrypted under their public key, to every other party. The final key K is computed as a function of $K\_1, \ldots K\_N$. For example, the final key K may be an "exclusive or" (e.g., XOR) operation of all the N keys. In some examples, by sending the hashed key value, each party is forced to commit to its random key. This may prevent a party from choosing its key maliciously after learning all of the other keys.

Timestamps associated with the impression events and conversion events are a crucial aspect of the attribution pipeline. Accurate timestamps are necessary for proper attribution (e.g., to ensure that the impression timestamp is before the conversion timestamp).

In some examples, an order preserving encryption (OPE) key is used through the key agreement protocol to send accurate timestamps. Through the key-agreement protocol all parties may additionally agree on an OPE key. In some examples, all parties except the MMP may agree on the OPE key. All of the impression events and conversion events are encrypted under the OPE key so that the impression timestamp is earlier in time than the conversion timestamp.

Machine Architecture

Figure 8:
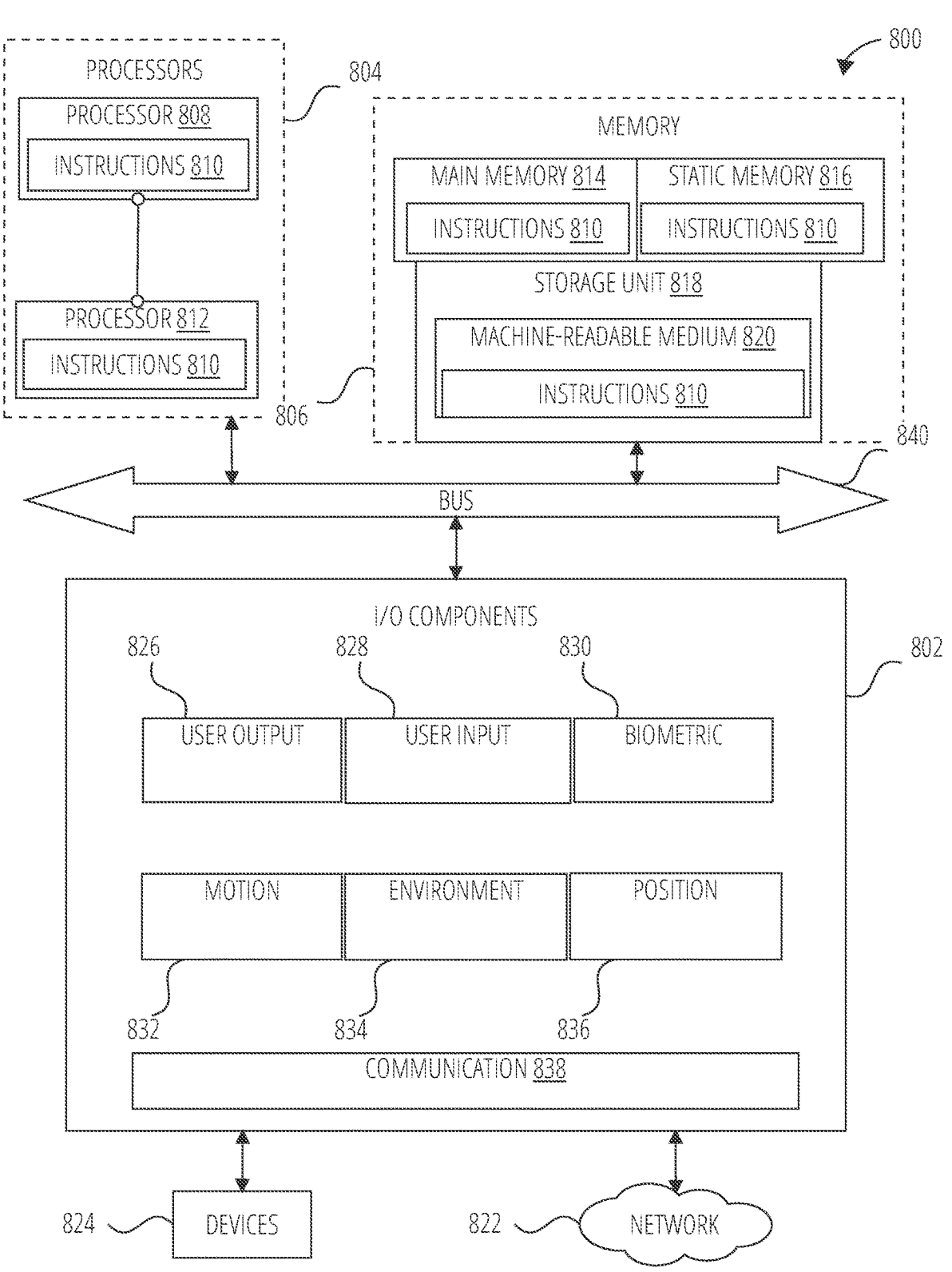
FIG. 8 is a diagrammatic representation of a machine in the form of a computer system within which a set of instructions may be executed for causing the machine to perform any one or more of the methodologies discussed herein, in accordance with some examples.

FIG. 8 is a diagrammatic representation of the machine 800 within which instructions 810 (e.g., software, a program, an application, an applet, an app, or other executable code) for causing the machine 800 to perform any one or more of the methodologies discussed herein may be executed. For example, the instructions 810 may cause the machine 800 to execute any one or more of the methods described herein. The instructions 810 transform the general, non-programmed machine 800 into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 810, sequentially or otherwise, that specify actions to be taken by the machine 800. Further, while only a single machine 800 is illustrated, the term "machine" shall also be taken to include a collection of machines that individually or jointly execute the instructions 810 to perform any one or more of the methodologies discussed herein. The machine 800, for example, may comprise the client device 102 or any one of a number of server devices forming part of the messaging server system 108. In some examples, the machine 800 may also comprise both client and server systems, with certain operations of a particular method or algorithm being performed on the server-side and with certain operations of the particular method or algorithm being performed on the client-side.

The machine 800 may include processors 804, memory 806, and input/output I/O components 802, which may be configured to communicate with each other via a bus 840. In an example, the processors 804 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 808 and a processor 812 that execute the instructions 810. The term "processor" is intended to include multi-core processors that may comprise two or more independent processors (sometimes referred to as "cores") that may execute instructions contemporaneously. Although FIG. 8 shows multiple processors 804, the machine 800 may include a single processor with a single-core, a single processor with multiple cores (e.g., a multi-core processor), multiple processors with a single core, multiple processors with multiples cores, or any combination thereof.

The memory 806 includes a main memory 814, a static memory 816, and a storage unit 818, both accessible to the processors 804 via the bus 840. The main memory 806, the static memory 816, and storage unit 818 store the instructions 810 embodying any one or more of the methodologies or functions described herein. The instructions 810 may also reside, completely or partially, within the main memory 814, within the static memory 816, within machine-readable medium 820 within the storage unit 818, within at least one of the processors 804 (e.g., within the Processor's cache memory), or any suitable combination thereof, during execution thereof by the machine 800.

The I/O components 802 may include a wide variety of components to receive input, provide output, produce output, transmit information, exchange information, capture measurements, and so on. The specific I/O components 802 that are included in a particular machine will depend on the type of machine. For example, portable machines such as mobile phones may include a touch input device or other such input mechanisms, while a headless server machine will likely not include such a touch input device. It will be appreciated that the I/O components 802 may include many other components that are not shown in FIG. 8. In various examples, the I/O components 802 may include user output components 826 and user input components 828. The user output components 826 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 828 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 802 may include biometric components 830, motion components 832, environmental components 834, or position components 836, among a wide array of other components. For example, the biometric components 830 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 832 include acceleration sensor components (e.g., accelerometer), gravitation sensor components, rotation sensor components (e.g., gyroscope).

The environmental components 834 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 836 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 802 further include communication components 838 operable to couple the machine 800 to a network 822 or devices 824 via respective coupling or connections. For example, the communication components 838 may include a network interface Component or another suitable device to interface with the network 822. In further examples, the communication components 838 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 824 may be another machine or any of a wide variety of peripheral devices (e.g., a peripheral device coupled via a USB).

Moreover, the communication components 838 may detect identifiers or include components operable to detect identifiers. For example, the communication components 838 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 838, such as location via Internet Protocol (IP) geolocation, location via Wi-Fi® signal triangulation, location via detecting an NFC beacon signal that may indicate a particular location, and so forth.

The various memories (e.g., main memory 814, static memory 816, and memory of the processors 804) and storage unit 818 may store one or more sets of instructions and data structures (e.g., software) embodying or used by any one or more of the methodologies or functions described herein. These instructions (e.g., the instructions 810), when executed by processors 804, cause various operations to implement the disclosed examples.

The instructions 810 may be transmitted or received over the network 822, using a transmission medium, via a network interface device (e.g., a network interface component included in the communication components 838) and using any one of several well-known transfer protocols (e.g., hypertext transfer protocol (HTTP)). Similarly, the instructions 810 may be transmitted or received using a transmission medium via a coupling (e.g., a peer-to-peer coupling) to the devices 824.

Software Architecture

Figure 9:
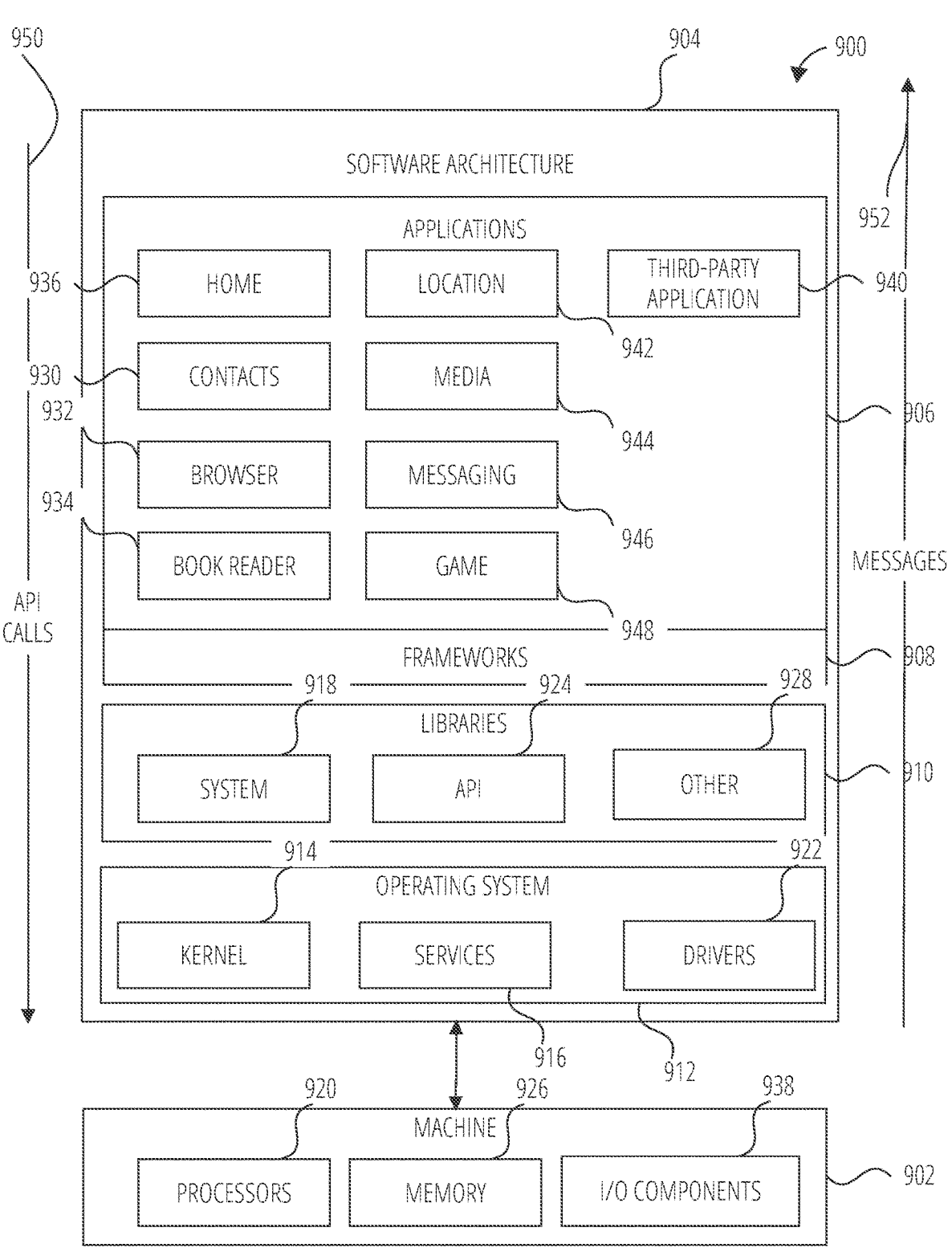
FIG. 9 is a block diagram showing a software architecture within which examples may be implemented.

FIG. 9 is a block diagram 900 illustrating a software architecture 904, which can be installed on any one or more of the devices described herein. The software architecture 904 is supported by hardware such as a machine 902 that includes processors 920, memory 926, and I/O components 938. In this example, the software architecture 904 can be conceptualized as a stack of layers, where each layer provides a particular functionality. The software architecture 904 includes layers such as an operating system 912, libraries 910, frameworks 908, and applications 906. Operationally, the applications 906 invoke API calls 950 through the software stack and receive messages 952 in response to the API calls 950.

The operating system 912 manages hardware resources and provides common services. The operating system 912 includes, for example, a kernel 914, services 916, and drivers 922. The kernel 914 acts as an abstraction layer between the hardware and the other software layers. For example, the kernel 914 provides memory management, processor management (e.g., scheduling), component management, networking, and security settings, among other functionality. The services 916 can provide other common services for the other software layers. The drivers 922 are responsible for controlling or interfacing with the underlying hardware. For instance, the drivers 922 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 910 provide a common low-level infrastructure used by the applications 906. The libraries 910 can include system libraries 918 (e.g., C standard library) that provide functions such as memory allocation functions, string manipulation functions, mathematic functions, and the like. In addition, the libraries 910 can include API libraries 924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 910 can also include a wide variety of other libraries 928 to provide many other APIs to the applications 906.

The frameworks 908 provide a common high-level infra-structure that is used by the applications 906. For example, the frameworks 908 provide various graphical user interface (GUI) functions, high-level resource management, and high-level location services. The frameworks 908 can provide a broad spectrum of other APIs that can be used by the applications 906, some of which may be specific to a particular operating system or platform.

In an example, the applications 906 may include a home application 936, a contacts application 930, a browser appli-cation 932, a book reader application 934, a location appli-cation 942, a media application 944, a messaging application 946, a game application 948, and a broad assortment of other applications such as a third-party application 940. The applications 906 are programs that execute functions defined in the programs. Various programming languages can be employed to create one or more of the applications 906, structured in a variety of manners, such as object-oriented programming languages (e.g., Objective-C, Java, or C++) or procedural programming languages (e.g., C or assembly language). In a specific example, the third-party application 940 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 940 can invoke the API calls 950 provided by the operating system 912 to facilitate functionality described herein.

Glossary

"Carrier signal" refers to any intangible medium that is capable of storing, encoding, or carrying instructions for execution by the machine, and includes digital or analog communications signals or other intangible media to facili-tate communication of such instructions. Instructions may be transmitted or received over a network using a transmis-sion medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smart-phones, tablets, ultrabooks, netbooks, laptops, multi-proces-sor systems, microprocessor-based or programmable con-sumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile commu-nications (GSM) connection, or other types of cellular or wireless coupling. In this example, the coupling may imple-ment any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technol-ogy, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organi-zations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hard-ware unit designed for use with other components and a part of a program that usually performs a particular function of related functions. Components may constitute either soft-ware components (e.g., code embodied on a machine-read-able medium) or hardware components. A "hardware com-ponent" is a tangible unit capable of performing certain operations and may be configured or arranged in a certain physical manner. In various examples, one or more com-puter systems (e.g., a standalone computer system, a client computer system, or a server computer system) or one or more hardware components of a computer system (e.g., a processor or a group of processors) may be configured by software (e.g., an application or application portion) as a hardware component that operates to perform certain opera-tions as described herein. A hardware component may also be implemented mechanically, electronically, or any suitable combination thereof. For example, a hardware component may include dedicated circuitry or logic that is permanently configured to perform certain operations. A hardware com-ponent may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedi-cated and permanently configured circuitry, or in temporar-ily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Consid-ering examples in which hardware components are tempo-rarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
identifying a plurality of impression events, each of the impression events associated with individual user identifiers;
receiving a key agreement protocol from a computing device, the key agreement protocol comprising a key, the computing device configured to initiate the key agreement protocol by:
generating a hashed user identifier based on an associated user identifier of an individual conversion event;
generating a random key;
encrypting the random key using a second public key;
generating an encrypted identifier by encrypting the hashed user identifier with the key;
storing the encrypted identifier, identifying a conversion event associated with the encrypted identifier; and
transmitting the encrypted random key;

accessing a set of impression events associated with the conversion event, wherein each impression event in the set of impression events is attributed to one or more entities; and determining a first count representing a number of impression events attributed to the conversion event.

2. The method of claim 1, wherein the method further comprises generating an encrypted identifier by encrypting the hashed user identifier with the key.

3. The method of claim 2, further comprising identifying a conversion event associated with the encrypted identifier.

4. The method of claim 1, further comprising determining a second count representing a number of impression events attributed to a first entity.

5. The method of claim 1, wherein the generating of the random key is by a first entity of the plurality of entities.

6. The method of claim 5, further comprising determining a second count representing a number of impression events attributed to the first entity.

7. The method of claim 5, wherein the encrypting of the random key is for a second entity of the plurality of entities.

8. The method of claim 1, wherein the key agreement protocol is initiated for each impression event.

9. The method of claim 1, wherein the key agreement protocol is initiated for the conversion event.

10. The method of claim 1, wherein the key agreement protocol is initiated for each impression event and for the conversion event.

11. The method of claim 1, wherein the first count is based on a predefined attribution model.

12. The method of claim 11, wherein the predefined attribution model comprises a first touch model.

13. The method of claim 1, wherein the key agreement protocol further comprises:

identifying a first random key associated with a first entity of the one or more entities and a second random key associated with a second entity of the one or more entities;

encrypting the first random key using a first public key for the first entity;

encrypting the second random key using a second public key for the second entity;

transmitting the encrypted first random key to the second entity and the encrypted second random key to the first entity; and computing a final key by applying a Boolean logic operation on the encrypted first random key and the encrypted second random key.

14. The method of claim 1, wherein the key agreement protocol further comprises:

identifying a first random key associated with a first entity of the one or more entities and a second random key associated with a second entity of the one or more entities;

generating a hashed first random key using the first random key and a hashed second random key using the second random key;

encrypting the hashed first random key using a first public key for the first entity;

encrypting the hashed second random key using a second public key for the second entity;

transmitting the encrypted hashed first random key to the second entity and the encrypted hashed second random key to the first entity; and computing a final key by applying a Boolean logic operation on the encrypted hashed first random key and the encrypted hashed second random key.

15. A system comprising:

a processor; and a memory storing instructions that, when executed by the processor, configure the processor to perform operations comprising:

identifying a plurality of impression events, each of the impression events associated with individual user identifiers;

receiving a key agreement protocol from a computing device, the key agreement protocol comprising a key, the computing device configured to initiate the key agreement protocol by:

generating a hashed user identifier based on an associated user identifier of an individual conversion event;

generating a random key;

encrypting the random key using a second public key;

generating an encrypted identifier by encrypting the hashed user identifier with the key;

storing the encrypted identifier, identifying a conversion event associated with the encrypted identifier; and transmitting the encrypted random key;

accessing a set of impression events associated with the conversion event, wherein each impression event in the set of impression events is attributed to one or more entities; and determining a first count representing a number of impression events attributed to the conversion event.

16. The system of claim 15, wherein the operations further comprise generating an encrypted identifier by encrypting the hashed user identifier with the key.

17. The system of claim 15, wherein the first count is based on a predefined attribution model.

18. The system of claim 15, wherein the key agreement protocol further comprises:

identifying a first random key associated with a first entity of the one or more entities and a second random key associated with a second entity of the one or more entities;

encrypting the first random key using a first public key for the first entity;

encrypting the second random key using a second public key for the second entity;

transmitting the encrypted first random key to the second entity and the encrypted second random key to the first entity; and computing a final key by applying a Boolean logic operation on the encrypted first random key and the encrypted second random key.

19. The system of claim 15, wherein the key agreement protocol further comprises:

identifying a first random key associated with a first entity of the one or more entities and a second random key associated with a second entity of the one or more entities;

generating a hashed first random key using the first random key and a hashed second random key using the second random key;

encrypting the hashed first random key using a first public key for the first entity;

encrypting the hashed second random key using a second public key for the second entity;

transmitting the encrypted hashed first random key to the second entity and the encrypted hashed second random key to the first entity; and computing a final key by applying a Boolean logic operation on the encrypted hashed first random key and the encrypted hashed second random key.

20. A non-transitory computer-readable storage medium including instructions that, when processed by a computer, configure the computer to perform operations comprising:

identifying a plurality of impression events, each of the impression events associated with individual user identifiers; 5 receiving a key agreement protocol from a computing device, the key agreement protocol comprising a key, the computing device configured to initiate the key agreement protocol by: 10 generating a hashed user identifier based on an associated user identifier of an individual conversion event;

generating a random key;

encrypting the random key using a second public key;

generating an encrypted identifier by encrypting the 15 hashed user identifier with the key;

storing the encrypted identifier, identifying a conversion event associated with the encrypted identifier; and transmitting the encrypted random key;

accessing a set of impression events associated with the 20 conversion event, wherein each impression event in the set of impression events is attributed to one or more entities; and determining a first count representing a number of impression events attributed to the conversion event. 25

\*    \*    \*    \*    \*